United States Patent
Moriyama

(10) Patent No.: US 6,356,904 B1
(45) Date of Patent: Mar. 12, 2002

(54) DATA PROCESSING METHOD, RECORDING MEDIUM, AND DATA PROCESSING APPARATUS

(75) Inventor: Koichi Moriyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/259,303

(22) Filed: Mar. 1, 1999

(30) Foreign Application Priority Data

Mar. 4, 1998 (JP) .......................................... 10-052494

(51) Int. Cl.$^7$ .............................................. G06F 17/30
(52) U.S. Cl. ...................... 707/10; 709/201; 709/206; 709/207
(58) Field of Search ................... 707/10, 1, 100; 709/201, 203, 217, 218, 219, 206, 207

(56) References Cited

U.S. PATENT DOCUMENTS

| | | | |
|---|---|---|---|
| 6,003,136 A | * 12/1999 | Schanze | 713/201 |
| 6,009,175 A | * 12/1999 | Schanze | 380/23 |
| 6,092,178 A | * 7/2000 | Jindal et al. | 712/27 |
| 6,175,920 B1 | * 1/2001 | Schanze | 713/150 |

\* cited by examiner

*Primary Examiner*—Frantz Coby
(74) *Attorney, Agent, or Firm*—Jay H. Maioli

(57) ABSTRACT

If an object enters a waiting state due to some problem while future-based message passing is being performed, the object is able to exit from the waiting state without needing to execute time-out processing. When sending a message from a client object to a server object, a data area is reserved. If processing executed by the server object is correctly completed, the data indicating the processing result is stored in the data area. If processing executed by the server object is not correctly completed, the data indicating the status of the server object is stored in the data area. By reading the data stored in the data area, the client object receives the data of the processing result if the processing of the server object has been correctly completed. If the processing of the server object has not been correctly completed, the client object receives the status data.

6 Claims, 8 Drawing Sheets

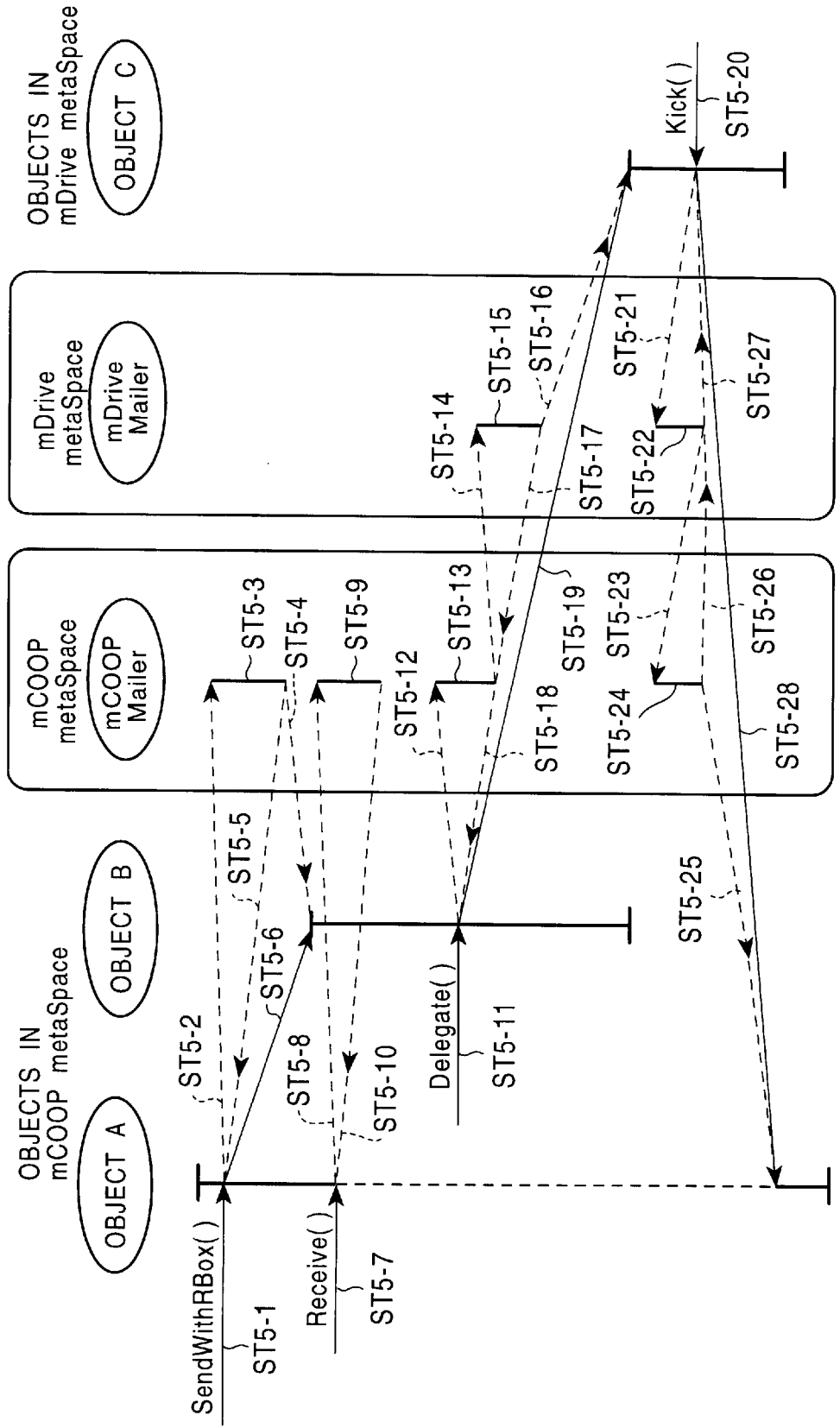

DATA PROCESSING METHOD, RECORDING MEDIUM, AND DATA PROCESSING APPARATUS

BACKGROUND OF THE INVENTION

1. Field of the Invention

The present invention relates to a data processing method employed when messages are exchanged between objects. The invention also relates to a recording medium on which an operating system implementing the above data processing method is recorded, and to a data processing apparatus provided with the above recording medium.

2. Description of the Related Art

Along with recent advances in software programming techniques, the development of software based on the object-oriented technique is progressing. When the object-oriented technique is applied to software, the functions of the software, such as application programs, can be formed into modules by objects. By exchanging the required information with each other as messages, the objects fulfill their functions as modules. Such message exchanges are referred to as "message passing".

As a method for implementing message passing, various techniques have been proposed and have been put into practical use. One of the techniques is "future"-based message passing. The basic operation of future-based message passing is shown in FIG. 1. In FIG. 1, a message sending object is shown as a client object, while a message receiving object is shown as a server object.

In future-based message passing, a message is sent from a client object to a server object, as represented by the arrow B1 in FIG. 1, to request the server object to perform predetermined processing. At this time, a data area for storing the result of the processing executed by the server object is reserved. The data area is an area for storing the result to be received by the client object, and is referred to as a "future".

The server object executes processing, as indicated by the solid line B2 in FIG. 1, in accordance with the request of the message sent from the client object. When the processing is completed, the server object stores the processing result in the future, as represented by the arrow B3 in FIG. 1.

Meanwhile, the client object continues processing, as indicated by the solid line B4 in FIG. 1, after sending the above message to the server object. Thereafter, when the client object requires the result of the processing performed by the server object, it reads the data stored in the future, as represented by the arrow B5 in FIG. 1.

At this time, if the result of the processing executed by the server object has not yet been stored in the future, the client object is in a waiting state, as represented by the single-dot-chain line B6 in FIG. 1. When the processing result sent from the server object is stored in the future, it is delivered to the client object from the future, as represented by the arrow B7 in FIG. 1.

That is, if the result of the processing executed by the server object is stored in the future, the client object immediately receives the processing result. If, however, the result of the processing performed by the server object has not yet been stored in the future, the client object remains in the waiting state before the result is stored in the future.

In future-based message passing, such as the one illustrated in FIG. 1, a situation frequently arises in which the client object is required to wait for the result of the processing executed by the server object after sending a message to the server object.

The above-described situation may occur not only when the processing of the server object has not yet been completed, but also when for example, an error occurs interrupting the normal execution of the server object. The above-described situation may also occur when message passing is unable to operate due to a breakdown of a communication channel, such as a network, required for message passing.

If the object cannot exit from the waiting state, it appears to the user that a system built into, for example, a set top box, has stopped for an unknown reason.

Accordingly, it is desirable that an operating system providing a function of future-based message passing be able to resume processing of an object even when the object enters the waiting state due to some problem, so that software running on the operating system is stably operated.

In the conventional operating system, with the occurrence of a waiting state, time-out processing is often executed regardless of the reason of the occurrence of a waiting-state in order to discontinue the above state. In this method, however, the waiting state continues until the time-out processing is started, thereby wasting time depending on the period set for starting the time-out processing. Additionally, even if the waiting state is discontinued by the time-out processing, the reason for the occurrence of the waiting state cannot be specified, which may further cause the occurrence of another waiting state.

SUMMARY OF THE INVENTION

In view of the above background of the conventional art, it is an object of the present invention to provide a data processing method in which even if an object enters a waiting state due to some problem while future-based message passing is being performed, the object can exit from the waiting state without needing to execute time-out processing.

It is another object of the present invention to provide a recording medium on which an operating system implementing the above-described data processing method is recorded, and to provide a data processing apparatus provided with such a recording medium.

In order to achieve the above object, according to one aspect of the present invention, there is provided a data processing method in which a message is sent from a client object to a server object, and the server object executes processing in response to a request by the message and returns a result of the processing to the client object. In this method, when a message is sent from the client object to the server object, an area for storing result data indicating the result of the processing executed by the server object, and an area for storing status data indicating a status of the server object are reserved. If the processing executed by the server object has been correctly completed, the result data is stored in the data area. If the processing executed by the server object has not been correctly completed, the status data is stored in the data area. By reading the data stored in the data area, the client object receives the result data if the processing executed by the server object has been correctly completed. If the processing executed by the server object has not been correctly completed, the client object receives the status data.

According to the aforementioned data processing method, if the processing executed by the server object has not been correctly completed, the status data indicating the status of the server object is delivered to the client object via the above-described data area. Thus, even if the client object enters the waiting state due to some problem while message passing is being performed, the status of the server object can be known by to the client object without needing to execute time-out processing, thereby enabling the client object to exit from the waiting state.

According to another aspect of the present invention, there is provided a recording medium on which an operating system is recorded. The operating system comprises message sending means, as an application program interface for describing an object, for sending to another object a message that requests it to perform processing and to return a result of the processing. The aforementioned operating system sends a message from a client object to a server object in accordance with the message-sending means, and reserves a data area including a portion for storing result data indicating a result of processing executed by the server object and a portion for storing status data indicating a status of the server object. The operating system further stores the result data in the data area if the processing executed by the server object has been correctly completed. The operating system stores the status data in the data area if the processing executed by the server object has not been correctly completed.

The operating system recorded on the recording medium stores the status data indicating the status of the server object in the above-described data area if the processing executed by the server object has not been correctly completed. Accordingly, by reading the data stored in the data area, the client object is able to receive the status data. Thus, even if the client object enters the waiting state due to some problem while message passing is being performed, the status of the server object can be known by the client object without needing to execute time-out processing, thereby enabling the client object to exit from the waiting state.

According to a further aspect of the present invention, there is provided a data processing apparatus comprising a recording medium on which an operating system is recorded. The operating system comprises message-sending means, as an application program interface for describing an object, for sending to another object a message that requests it to perform processing and to return a result of the processing. The aforementioned operating system sends a message from a client object to a server object in accordance with the message-sending means, and reserves a data area including a portion for storing result data indicating a result of processing executed by the server object and a portion for storing status data indicating a status of the server object. The operating system stores the result data in the data area if the processing executed by the server object has been correctly completed. The operating system stores the status data in the data area if the processing executed by the server object has not been correctly completed.

The operating system recorded on the recording medium provided with the data processing apparatus stores the status data of the server object in the above-described data area if the processing executed by the server object has not been correctly completed. Accordingly, by reading the data stored in the data area, the client object is able to receive the status data. Thus, even if the client object enters the waiting state due to some problem while message passing is being performed, the status of the server object can be known by to the client object without needing to execute time-out processing, thereby enabling the client object to exit from the waiting state.

In this specification, software for managing the execution of application programs is referred to as "an operating system" in a broad sense. That is, the operating system described in this specification includes not only basic software for managing hardware, but also, software operating on basic software for managing hardware and managing the execution of application programs, which is referred to as, "middleware". Further, the operating system described in this specification includes software implementing a virtual computer system, in which a plurality of program execution environments are implemented by a single computer, and it appears to the user that a plurality of computers were operating.

BRIEF DESCRIPTION OF THE DRAWINGS

FIG. 8 illustrates an example of a scenario of message passing performed between different metaSpaces.

DESCRIPTION OF THE PREFERRED EMBODIMENT

An embodiment of the present invention is described below in detail with reference to the drawings.

1. Hardware Environment

An example of a data processing apparatus incorporating the present invention is first described with reference to FIG. 2. As an embodiment of the present invention, a television set loaded with a data processing function incorporating the present invention is described. However, the present invention is applicable to other types of data processing apparatuses. That is, the present invention is widely used in data processing apparatuses on which an operating system runs, for example, audio-visual machines (what is called, "AV machines") other than the television set, office machines, and ordinary computers.

Figure 1:
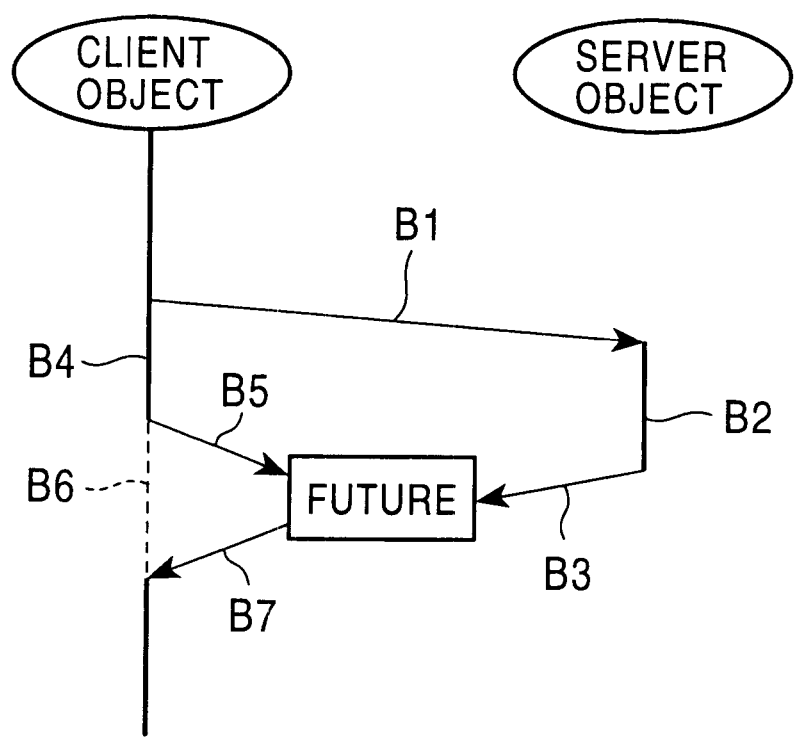
FIG. 1 is a prior art illustration of the basic operation of message passing performed by using a future.
Figure 2:
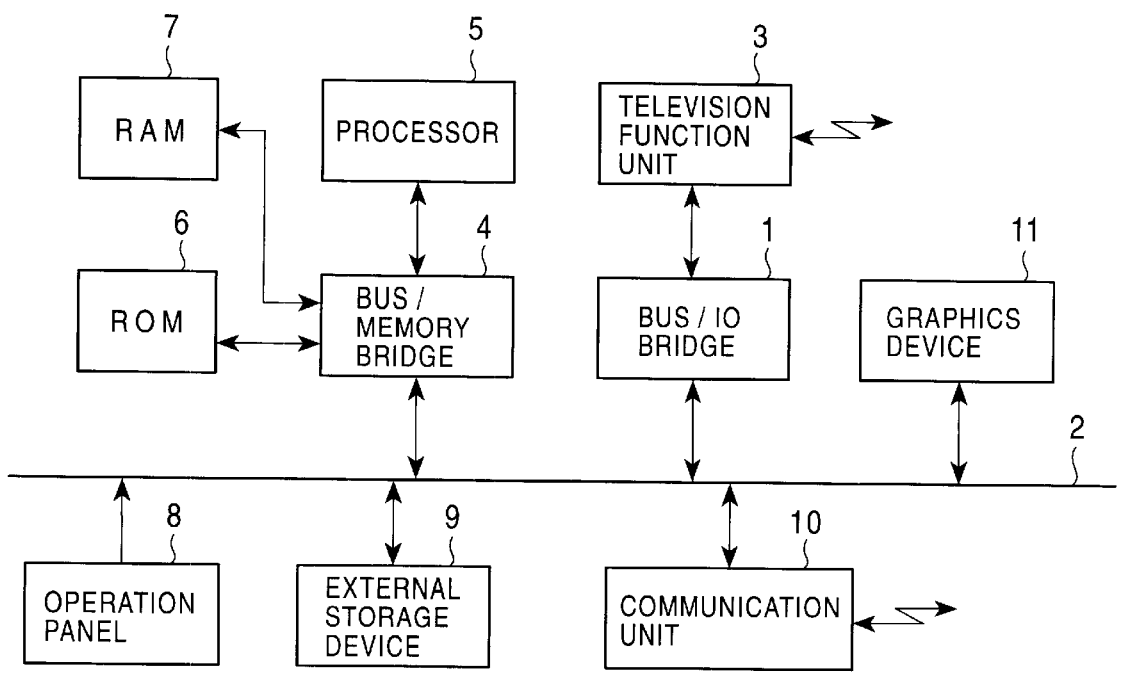
FIG. 2 illustrates the schematic configuration of an example of a television set incorporating the present invention.

The television set shown in FIG. 2, which serves as the data processing apparatus incorporating the present invention, receives a signal from a broadcast station via an antenna or a cable (neither of them is shown), and based on the signal, displays an image on an image display unit, such as a cathode ray tube or a liquid crystal panel, and also outputs sound from a speaker.

The television set is not only provided with an ordinary television function, but is also able to receive programs and data from an external source. The television set is formed of, as illustrated in FIG. 2, a television function unit 3 connected to a bus 2 via a bus/input output (IO) bridge 1, a processor 5 connected to the bus 2 via a bus/memory bridge 4, a read only memory (ROM) 6 and a random access memory (RAM) 7 connected to the processor 5 via the bus/memory bridge 4, and an operation panel 8, an external storage device 9, a communication unit 10, and a graphics device 11, all of which are connected to the bus 2.

The television function unit 3 serves the function of reproducing images and sounds based on a signal received by the antenna or the cable (neither of them is shown). The television function unit 3 is connected to the bus 2 via the bus/IO bridge 1 so that it can transmit or receive signals to or from the other elements.

The processor 5, which serves as a computation unit for controlling the individual elements of the television set, is connected to the bus 2 via the bus/memory bridge 4. The ROM 6 and the RAM 7 are connected to the processor 5 via the bus/memory bridge 4.

The ROM 6 stores an operating system and application programs used for the control performed by the processor 5. The operating system stored in the ROM 6 is an object-oriented operating system implementing object orientation.

The RAM 7 is used as a work area for the processor 5. More specifically, the processor 5 runs the operating system and the application programs stored in the ROM 6 by using the RAM 7 as a work area, thereby controlling the individual elements of the television set.

The operation panel 8 is an input unit for receiving the operation which is input by the user, and a signal indicating an instruction for, for example, the switching of the channel or the volume control of the television set. More specifically, the operation panel 8 is formed of an input unit provided with a plurality of buttons for inputting various signals and a pointing device, i.e., a mouse. The signal input through the operation panel 8 is input into the processor 5 via the bus 2 and the bus/memory bridge 4. The processor 5 then executes predetermined computational processing based on the signal input through the operation panel 8, thereby controlling the individual elements.

The external storage device 9, which is formed of, for example, a hard.disk drive unit, is used for recording data, such as images and sounds, control data required for controlling the television set, application programs externally downloaded via the communication unit 10, etc.

The communication unit 10, which is an input/output unit for performing data communications with an external source, is formed of a modem, a terminal adapter, etc.

The graphics device 11 processes data recorded on the external storage device 9 and data received from an external source via the communication unit 10, and displays the corresponding images.

The television set not only includes an ordinary television function provided by the television function unit 3, but also receives data from an external source via the communication unit 10. More specifically, the television set is able to receive, for example, a new software module from an external network via the communication unit 10, thereby upgrading the version of the operating system and the application programs.

In this television set, the processor 5 runs the operating system stored in the ROM 6, and also executes the application programs stored in the ROM 6 and in the external storage device 9 on the operating system, thereby controlling the individual elements of the television set. That is, the television set is provided with the ROM 6, which serves as a computer-readable recording medium on which the operating system is recorded.

The operating system may be stored in the RAM 7 or the external storage device 9, particularly when it is desired that the operating system be overwritten.

2. Software Environment

The software environment of the above-described television set is now described.

2-1 Schematic Configuration of Operating System

The operating system used in the aforementioned television set is an object-oriented operating system. In other words, software, such as an application program, running on the operating system is formed into modules as objects, and object interaction is conducted by message passing.

Figure 3:
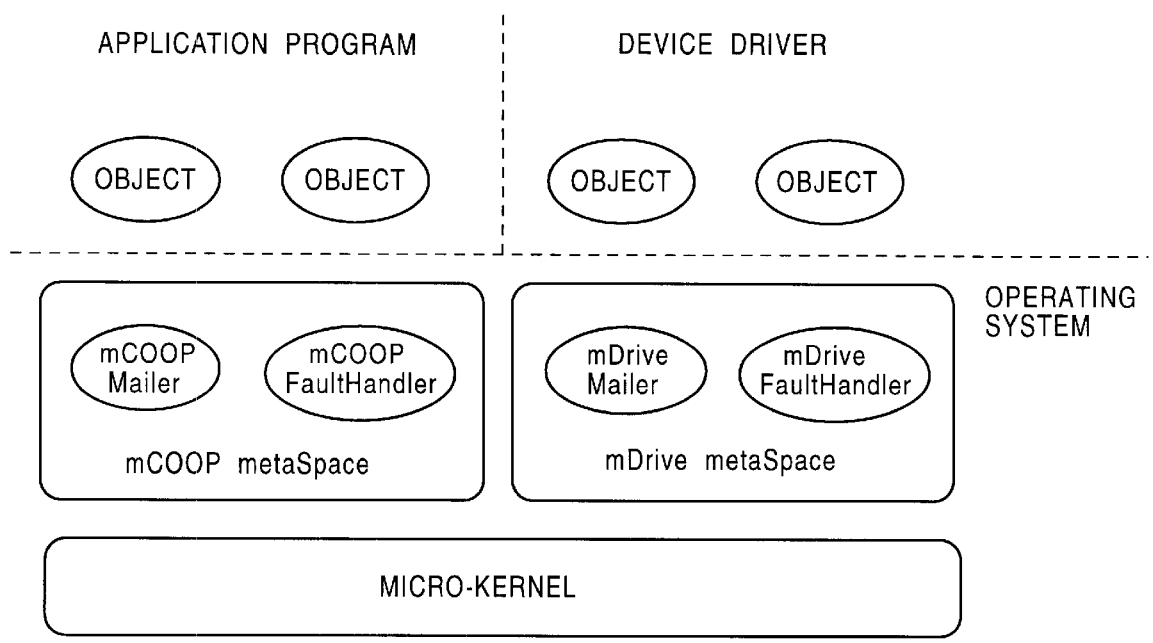
FIG. 3 illustrates the operating system installed in the television set shown in FIG. 2.

This operating system has a micro-kernel, as shown in FIG. 3, that provides the basic function as the operating system, thereby making it possible to simultaneously provide a plurality of program execution environments on the micro-kernal. In the following description, the program execution environment provided by the operating system is referred to as a "metaSpace".

More specifically, the operating system provides, as a metaSpace, an mCOOP metaSpace constructed by a plurality of objects, and an mDrive metaSpace constructed by a plurality of objects. An application program interface (hereinafter referred to as "API") used for describing objects of an application program is assigned to each metaSpace. In the following description, an object used in a metaSpace is referred to as a "metaObject".

The mCOOP metaSpace is a metaSpace primarily for operating an object-oriented application program (for example, an application program for implementing a graphical user interface for controlling the operation panel 8). The "m" in mCOOP metaSpace represents a metaSpace, and "COOP" stands for Concurrent Object Oriented Programming.

The mDrive metaSpace is a metaSpace for operating a device driver (for example, a device driver for controlling the graphics device 11 or a device driver for controlling the communication unit 10 to transmit and receive data via a network) primarily for controlling hardware. The "m" in mDrive metaSpace designates a metaSpace, and "Drive" represents a metaSpace for operating the device driver (Device Driver).

That is, in this operating system, the mCOOP metaSpace and the mDrive metaSpace are operated on the micro-kernel. An application program formed into modules as objects is operated in the mCOOP metaSpace, while a device driver formed into modules as objects is operated in the mDrive metaSpace.

This operating system is able to provide not only mCOOP metaSpace and mDrive metaSpace, as the metaSpace operating on the micro-kernel, but also a metaSpace for operating, for example, a procedure-oriented application program (for example, an application program for causing the television function unit 3 to display moving pictures).

The metaObject forming mCOOP metaSpace includes, for example, an object "mCOOPMailer" and an object "mCOOPFaultHandler". The object "mCOOPMailer" is a metaObject used for performing message passing between application programs running in the mCOOP metaSpace. The object "mCOOPFaultHandler" is a metaObject for executing exception handling. In practice, the mCOOP metaSpace is formed, not only of the above-described metaObjects, but also of other metaObjects.

The metaObject forming mDrive metaSpace includes, for example, an object "mDriveMailer" and an object "mDriveFaultHander". The object "mDriveMailer" is a metaObject used for performing message passing between device drivers running in the mDrive metaSpace. The object "mDriveFaultHandler" is a metaObject for executing exception handling. In practice, the mDrive metaSpace, as well as the mCOOP metaSpace, is formed not only of the above-described metaObjects, but also of other metaObjects.

This operating system provides the function of future-based message passing, which is discussed in detail below. In the following description, in the future-based message passing, the object that sends a message to another object to request it to execute processing is referred to as a "client object". Conversely, the object that receives the message from the client object and executes processing based on the message is referred to as a "server object".

2-2 mCOOP metaSpace API

In order to perform future-based message passing in the mCOOP metaSpace, the aforementioned operating system provides the following methods as the APIs used for describing the objects operating in the mCOOP metaSpace. In this specification, the API is indicated according to the description method of the Object Management Group Interface Definition Language (OMG IDL).

sError SendWithRBox(in OID destObjID, in Selector meth, in any msg, in size_t sizeOfMsg, out RID rBoxID)

sError Receive(in RID rBoxID, in any msg, in size_t sizeOfMsg)

sError Reply(in any resultMsg, in size_t sizeOfResultMsg)

sError Delegate (in OID destObjID, in Selector meth, in any msg, in size_t sizeOfMsg)

The above methods are discussed below in detail.

2-2-1 SendWithRBox( )

sError SendWithRBox(in OID destObjID, in Selector meth, in any msg, in size_t sizeOfMsg, out RID rBoxID)

The method "SendWithRBox" is a message-sending method for sending a message from a client object to a server object. That is, the method "SendWithRBox" is employed when it becomes necessary for the client object to obtain the result of the processing executed by the server object after it has sent a message to the server object.

The argument "destObjID" is an argument of the "OID" type, which is a data type for specifying the object. The value specifying the server object is set in the argument "destObjID".

The argument "meth" is an argument of the "Selector" type, which is a data type for designating the method. The value designating the method of the server object for describing the processing to be requested is set in the argument "meth".

The argument "msg" is an argument of the "any" type, which is an arbitrary data type. The pointer to the area for storing the message to be delivered to the server object is set in the argument "msg".

The argument "sizeOfMsg" is an argument of the "size_t" type, which is a data type for specifying the size of the data. The value indicating the size of the message to be delivered to the server object is set in the argument "sizeOfMsg".

When the method "SendWithRBox" is issued, the data area "RBox" for storing the result of the processing executed by the server object is reserved by the object "mCOOPMailer", which will be discussed later. The data area "RBox" is an area in which the result to be received by the client object is stored, and is referred to as a "future".

After sending the message to the server object, the method "SendWithRBox" obtains the identifier "rBoxID" of the "RID" type, which is a data type for specifying the data area "RBox". The identifier "RBoxID" is an identifier for designating the data area "RBox" reserved by the object "mCOOPMailer" when the method "SendWithRBox" has been issued.

The method "SendWithRBox" acquires the value of the "sError" type as the return value, which is a data type representing the error code. That is, if the processing of the "SendWithRBox" is not correctly completed in issuing this method, the error code indicating the error reason is returned as the return value. If the processing is correctly completed, the value indicating that the processing has been correctly completed is returned as the return value.

2-2-2 Receive( )

sError Receive(in RID rBoxID, in any msg, in size_t sizeOfMsg)

The method "Receive" is a data reading method for reading data stored in the data area "RBox". That is, the method "Receive" is used when the client object receives the result of the processing executed by the server object after it has issued the method "SendWithRBox".

The argument "rBoxID" is an argument of the "RID" type, which is a data type for designating the data area "RBox". The identifier for specifying the data area "RBox" which stores the result of the processing performed by the server object is set in the argument "rBoxID". That is, the value of the identifier "rBoxID" acquired upon issuing the method "SendWithRBox" is set in the argument "rBoxID".

The argument "msg" is an argument of the "any" type, which is an arbitrary data type. The pointer to the area for storing the received message is set in the argument "msg".

The argument "sizeOfMsg" is an argument of the "size_t" type, which is a data type for specifying the size of the data. The value indicating the size of the area for storing the received message is set in the argument "sizeOfMsg".

The method "Receive" acquires the value of the "sError" type as the return value, which is a data type representing the error code. That is, if the processing of the method "Receive" is not correctly completed in issuing this method, the error code indicating the error reason is returned as the return value. If the processing is correctly completed, the value indicating that the processing has been correctly completed is returned as the return value.

2-2-3 Reply( )

sError Reply(in any resultMsg, in size_t sizeOfResultMsg)

The method "Reply" is used when the server object returns the processing result to the client object after the client object has sent the method "SendWithRBox".

The argument "resultMsg" is an argument of the "any" type, which is an arbitrary data type. The pointer to the area for storing the message to be sent to the client object is set in the argument "resultMsg".

The argument "sizeOfResultMsg" is an argument of the "size_t" type, which is a data type for designating the size of the data. The value indicating the size of the message to be sent to the client object is set in the argument "sizeOfResultMsg".

The method "Reply" obtains the value of the "sError" type as the return value, which is a data type representing the error code. That is, if the processing of the "Reply" is not correctly completed in issuing this method, the error code indicating the error reason is returned as the return value. If the processing is correctly completed, the value indicating that the processing has been correctly completed is returned as the return value.

2-2-4 Delegate( )

sError Delegate (in OID destObjID, in Selector meth, in any msg, in size_t sizeOfMsg)

The method "Delegate" is an authorization delegating method for delegating an authorization among objects. More specifically, the method "Delegate" is used when the authorization to return the result of the processing executed by the server object to the client object is delegated among a plurality of server objects.

In the following description, the above-mentioned authorization is referred to as the "reply authorization". Among the server objects, the object that delegates the reply authorization is referred to as an "authorization-delegating object", while the object that is delegated to receive the reply authorization is referred to as an "authorization-delegated object".

The argument "destObjID" is an argument of the "OID" type, which is a data type for specifying the object. The value representing the authorization-delegated object is set in the argument "destObjID".

The argument "meth" is an argument of the "Selector" type, which is a data type for specifying the method. The value indicating the method of the authorization-delegated object for describing the required processing is set in the argument "meth".

The argument "msg" is an argument of the "any" type, which is an arbitrary data type. The pointer to the area for storing the message to be sent to the authorization-delegated object is set in the argument "msg".

The argument "sizeOfMsg" is an argument of the "size_t" type, which is a data size for designating the size of the data. The value representing the size of the message to be sent to the authorization-delegated object is set in the argument "sizeOfMsg".

The method "Delegate" obtains the value of the "sError" type as the return value, which is a data type representing the error code. That is, if the processing of the "Delegate" is not correctly completed in issuing this method, the error code indicating the error reason is returned as the return value. If the processing is correctly completed, the value indicating that the processing has been correctly completed is returned as the return value.

2-3 mDrive metaSpace API

In order to perform future-based message passing in the mDrive metaSpace, the aforementioned operating system provides the following methods as the APIs used for describing the objects operating in the mDrive metaSpace. The API is represented in compliance with the OMG IDL.

sError SendWithContinuation(in OID destObjID, in Selector meth, in any msg, in size_t sizeOfMsg, in Selector contMeth)

sError Kick(in ContID contID, in any msg, in size_t sizeOfMsg)

The above methods are described in detail below.

2-3-1 SendWithContinuation( )

sError SendWithContinuation(in OID destObjID, in Selector meth, in any msg, in size_t sizeOfMsg, in Selector contMeth)

The method "SendWithContinuation" is a message-sending method for sending a message from the client object to the server object. The method "SendWithContinuation" is used when it becomes necessary for the client object to perform a specific method (hereinafter referred to as a "continuation method") upon receiving the processing result of the server object after the client object has sent the message to the server object.

The argument "destObjID" is an argument of the "OID" type, which is a data type for specifying the object. The value for specifying the server object is set in the argument "destObjID".

The argument "meth" is an argument of the "Selector" type, which is a data type for designating the method. The value representing the method of the server object for describing the requested processing is set in the argument "meth".

The argument "msg" is an argument of the "any" type, which is an arbitrary data type. The pointer to the area for storing the message to be delivered to the server object is set in the argument "msg".

The argument "sizeOfMsg" is an argument of the "size_t" type, which is a data type for specifying the size of the data. The value indicating the size of the message to be delivered to the server object is set in the argument "sizeOfMsg".

The argument "contMeth" is an argument of the "Selector" type, which is a data type for designating the method. The value for specifying the continuation method is set in the argument "contMeth".

Upon issuing the method "SendWithContinuation", the data area "Continuation" is reserved by the object "mDriveMailer", which will be discussed later, and the information concerning the continuation method is stored in the data area "Continuation". The data area "Continuation" is an area for storing the continuation method to be executed by the client object, and is referred to as a "future".

The method "SendWithContinuation" acquires the value of the "sError" type as the return value, which is a data type representing the error code. That is, if the processing of the "SendWithContinuation" is not correctly completed in issuing this method, the error code indicating the error reason is returned as the return value. If the processing is correctly completed, the value indicating that the processing has been correctly completed is returned as the return value.

2-3-2 Kick( )

sError Kick(in ContID contID, in any msg, in size_t sizeOfMsg)

The method "Kick" is employed when the server object instructs the client object to execute the continuation method after the client object has issued the method "SendWithContinuation".

The argument "contID" is an argument of the "contID" type, which is a data type for designating the data area "Continuation". The identifier for specifying the data area "Continuation" reserved by the object "mDriveMailer" upon issuing the method "SendWithContinuation" is set in the argument "contID".

The argument "msg" is an argument of the "any" type, which is an arbitrary data type. The pointer to the area for storing the message to be delivered to the client object is set in the argument "msg".

The argument "sizeOfMsg" is an argument of the "size_t" type, which is a data type for specifying the size of the data. The value representing the size of the message to be delivered to the client object is set in the argument "sizeOfMsg".

The method "Kick" obtains the value of the "sError" type as the return value, which is a data type representing the error code. That is, if the processing of the method "Kick" is not correctly completed in issuing this method, the error code indicating the error reason is returned as the return value. If the processing is correctly completed, the value indicating that the processing has been correctly completed is returned as the return value.

2-4 Data Area Used for Message Passing

In performing message passing in the mCOOP metaSpace, the aforementioned operating system uses the data area "RBox" as a future, and also uses the data area "DeliveryBoxA" for delivering information from the client object to the server object.

Further, in performing message passing in the mDrive metaSpace, the aforementioned operating system uses the data area "Continuation" as a future, and also uses the data area "DeliveryBoxB" for delivering information from the client object to the server object.

The above-described operating system reserves the data area "Thread" for each object in order to store the information used for managing the execution state of the object. The operating system also stores the information concerning the future in the data area "Thread". The object is operating as a single thread in the mCOOP metaSpace and in the mDrive metaSpace, one thread corresponding to one object. The information concerning the thread is stored in the data area "Thread" as the information for managing the execution state of the object.

The data areas "RBox", "DeliveryBoxA", "Continuation", "DeliveryBoxB", and "Thread" are data areas used by the operating system for providing the function of the message passing or for managing the object. These data areas are managed by the operating system so that they cannot be directly accessed by the application programs or the device drivers. The above-described data areas are discussed in detail below.

2-4-1 RBox

The data area "RBox" is reserved by the object "mCOOP-Mailer" upon issuing the method "SendWithRBox". More specifically, the reservation of the data area "RBox" by the object "mCOOPMailer" is performed by creating the instances of a class (hereinafter referred to as the "class 'RBox'") having attributes shown in Table 1. In Table 1, among the attributes of the class "RBox", only a minimal number of attributes required for implementing the basic form of message passing in the mCOOP metaSpace are shown. Attributes other than the attributes shown in Table 1 may be included.

TABLE 1

| RBOX | |
|---|---|
| ThreadID | creator |
| bool | ready |
| void* | resultMsg |
| t_size | sizeOfResultMsg |
| sError | status |

Table 1 shows that the class "RBox" has an attribute "creator" of the "ThreadID" type, which is a data type for specifying the data area "Thread" to be set for each object.

The class "RBox" also has an attribute "ready" of the "bool" type, which is a data type for logical values, an attribute "resultMsg" of the "void*" type, which is a data type representing the pointer, and an attribute "sizeOfResultMsg" of the "size_t" type, which is a data type for specifying the size of the data. These attributes are used as the area for storing the result data of the processing executed by the server object.

The class "RBox" further has an attribute "status" of the "sError" type, which is a data type indicating the error code, as the area for storing the data representing the status of the server object.

The identifier for specifying the data area "Thread" corresponding to the object that has created the data area "RBox" (i.e., the client object that has issued the method "SendWithRBox") is set in the attribute "creator". In the mCOOP metaSpace, the object is operating as a single thread, as discussed above, and one data area "Thread" is assigned to one object. Accordingly, if the data area "Thread" is specified by the attribute "creator", the corresponding client object is determined.

The value indicating whether the processing result of the server object has been returned is set in the attribute "ready".

In other words, the attribute "ready" is a flag indicating whether the result message to be returned from the server object to the client object is ready.

The pointer to the area for storing the message to be delivered to the client object as the processing result of the server object is set in the attribute "resultMsg".

The value representing the size of the message to be delivered to the client object as the processing result of the server object is set in the attribute "sizeOfResultMsg".

The code indicating the status of the server object as the information to be reported to the client object is set in the attribute "status". More specifically, if the processing of the server object is not correctly completed due to the occurrence of an exception interrupting the normal execution of the server object, the message indicating a failure in performing normal processing is reported to the object "mCOOPMailer" from the object "mCOOPFaultHandler", which will be discussed later. Thus, the error code indicating the status of the server object is set in the attribute "status" by the object "mCOOPMailer". If the processing is correctly executed by the server object, the value indicating that the server object is in a normal status is set in the attribute "status".

When the method "Receive" is issued by the client object, the client object refers to the attribute "ready" so as to determine whether the result of the processing executed by the server object has been returned. If the processing result of the server object has been returned, the client object refers to the attribute "resultMsg" so as to specify the area for storing the message to be delivered to the client object as the processing result of the server object, thereby reading the data having the size indicated by the attribute "sizeOfResultMsg" from the above-mentioned area. As a result, the message to be delivered to the client object is read and delivered to the client object.

2-4-2 DeliveryBoxA

Upon issuing the method "SendWithRBox", the data area "DeliveryBoxA" is reserved by the object "mCOOPMailer" to deliver information from the client object to the server object. More specifically, the reservation of the data area "DeliveryBoxA" by the object "mCOOPMailer" is performed by creating the instances of a class (hereinafter referred to as the "class 'DeliveryBoxA'", having attributes shown in Table 2. In Table 2, among the attributes of the class "DeliveryBoxA", only a minimal number of attributes required for implementing the basic form of message passing in the mCOOP metaSpace are shown. Attributes other than the attributes shown in Table 2 may be included.

TABLE 2

| DeliveryBoxA | |
|---|---|
| RID | rBoxID |
| void* | msg |
| t_size | sizeOfMsg |

Table 2 shows that the class "DeliveryBoxA" has an attribute "rBoxID" of the "RID" type, which is a data type for specifying the data area "RBox", an attribute "msg" of the "void*" type, which is a data type indicating the pointer, and an attribute "sizeOfMsg" of the "size_t" type, which is a data type for designating the size of the data.

The identifier for specifying the data area "RBox" used for performing message passing using the data area "DeliveryBoxA" is set in the attribute "rBoxID".

The pointer to the area for storing the message to be delivered from the client object to the server object is set in the attribute "msg".

The value representing the size of the message to be delivered from the client object to the server object is set in the attribute "sizeOfMsg".

By using the data area "DeliveryBoxA" reserved by creating the instances of the class "DeliveryBoxA", the operating system is able to send the information concerning the data area "RBox" together with the message that is sent from the client object to the server object. In other words, by using the data area "DeliveryBoxA", the operating system is able to simultaneously handle the message and the future in the mCOOP metaSpace.

2-4-3 Continuation

Upon issuing the method "SendWithContinuation", the data area "Continuation" is reserved by the object "mDrive-Mailer" in order to store the information concerning the continuation method therein. More specifically, the reservation of the data area "Continuation" by the object "mDrive-Mailer" is performed by creating the instances of a class (hereinafter referred to as the "class 'Continuation'") having attributes indicated in Table 3. In Table 3, among the attributes of the class "Continuation", only a minimal number of attributes required for implementing the basic form of message passing in the mDrive metaSpace are shown. Attributes other than the attributes shown in Table 3 may be included.

TABLE 3

| Continuation | |
|---|---|
| ThreadID | creator |
| Selector | meth |

Table 3 indicates that the class "Continuation" has an attribute "creator" of the "ThreadID" type, which is a data type for specifying the data area "Thread" set for each object, and an attribute "meth" of the "Selector" type, which is a data type for designating the method.

The identifier for specifying the data area "Thread" corresponding to the object that has created the data area "Continuation" (i.e., the client object that has issued the method "SendWithContinuation") is set in the attribute "creator". In the mDrive metaSpace, the object is operating as a single thread, as discussed above, and one data area "Thread" corresponds to one object. Accordingly, when the data area "Thread" is specified by the attribute "creator", the corresponding client object is determined.

The value representing the continuation method of the client object is set in the attribute "meth".

When the method "Kick" is issued by the server object, the client object refers to the attribute "meth" so as to specify the continuation method of the client object, thereby starting the specified continuation method.

2-4-4 DeliveryBoxB

Upon issuing the method "SendWithContinuation", the data area "DeliveryBoxB" is reserved by the object "mDriveMailer" in order to deliver information from the client object to the server object. More specifically, the reservation of the data area "DeliveryBoxB" by the object "mDriveMailer" is conducted by creating the instances of a class (hereinafter referred to as the "class 'DeliveryBoxB'") having attributes indicated in Table 4. In Table 4, among the attributes of the class "DeliveryBoxB", only a minimal number of attributes required for implementing the basic form of message passing in the mDrive metaSpace are shown. Attributes other than the attributes shown in Table 4 may be included.

TABLE 4

| DeliveryBoxB | |
|---|---|
| ContID | contID |
| void* | msg |
| t_size | sizeOfMsg |

Table 4 shows that the class "DeliveryBoxB" has an attribute "contID" of the "ContID" type, which is a data type for designating the data area "Continuation", an attribute "msg" of the "void*" type, which is a data type indicating the pointer, and an attribute "sizeOfMsg" of the "size_t" type, which is a data type for specifying the size of the data.

The identifier for specifying the data area "Continuation" used for message passing employing the data area "DeliveryBoxB" is set in the attribute "contID".

The pointer to the area for storing the message to be delivered from the client object to the server object is set in the attribute "msg".

The value indicating the size of the message to be delivered from the client object to the server object is set in the attribute "sizeOfMsg".

By using the data area "DeliveryBoxB" reserved by creating the instances of the class "DeliveryBoxB", the operating system is able to send the information concerning the data area "Continuation" together with the message that is sent from the client object to the server object. In other words, by using the data area "DeliveryBoxB", the operating system is able to simultaneously handle the message and the future in the mDrive metaSpace.

2-4-5 Thread

In the mCOOP metaSpace and in the mDrive metaSpace, as noted above, the object is operating as a single thread, and one thread is assigned to one object. The information concerning each thread is stored in the data area "Thread" as the information for managing the execution state of the object. That is, the operating system reserves the data area "Thread" for each object in order to store the information for managing the execution state of the object therein.

As the information for managing the execution state of the object, for example, the information indicating whether the object is in the waiting state or in the execution state, is stored in the data area "Thread". In performing future-based message passing, the information concerning the future is also stored in the data area "Thread".

More specifically, it is now assumed that the object is operating in the mCOOP metaSpace. In performing future-based message passing, the identifier "rBoxID" for specifying the data area "RBox" used for message passing is stored by the object "mCOOPMailer", as the information concerning the future, in the data area "Thread" corresponding to the object.

It is now assumed that the object is operating in the mDrive metaSpace. In conducting future-based message passing, the identifier "contID" for specifying the data area "Continuation" used for message passing is stored by the object "mDriveMailer" in the data area "Thread" corresponding to the object.

2-5 Message Passing

A detailed description is given below by taking specific scenarios, as examples, of message passing performed by using the aforementioned methods and data areas.

FIGS. 4 through 8 illustrate a shift of processing and message exchange performed in message passing. In FIGS. 4 through 8, the single-dot-chain arrows designate a shift of processing and message exchange within the operating system, while the solid arrows indicate a shift of processing and message exchange from the point of view of the application program.

2-5-1 Message Passing Using SendWithRBox( )

A description is given below of message passing performed by using the method "SendWithRBox" in the mCOOP metaSpace when the processing proceeds in a normal condition and when an exception occurs.

2-5-1-1 When Processing is Executed in a Normal Condition

Figure 4:
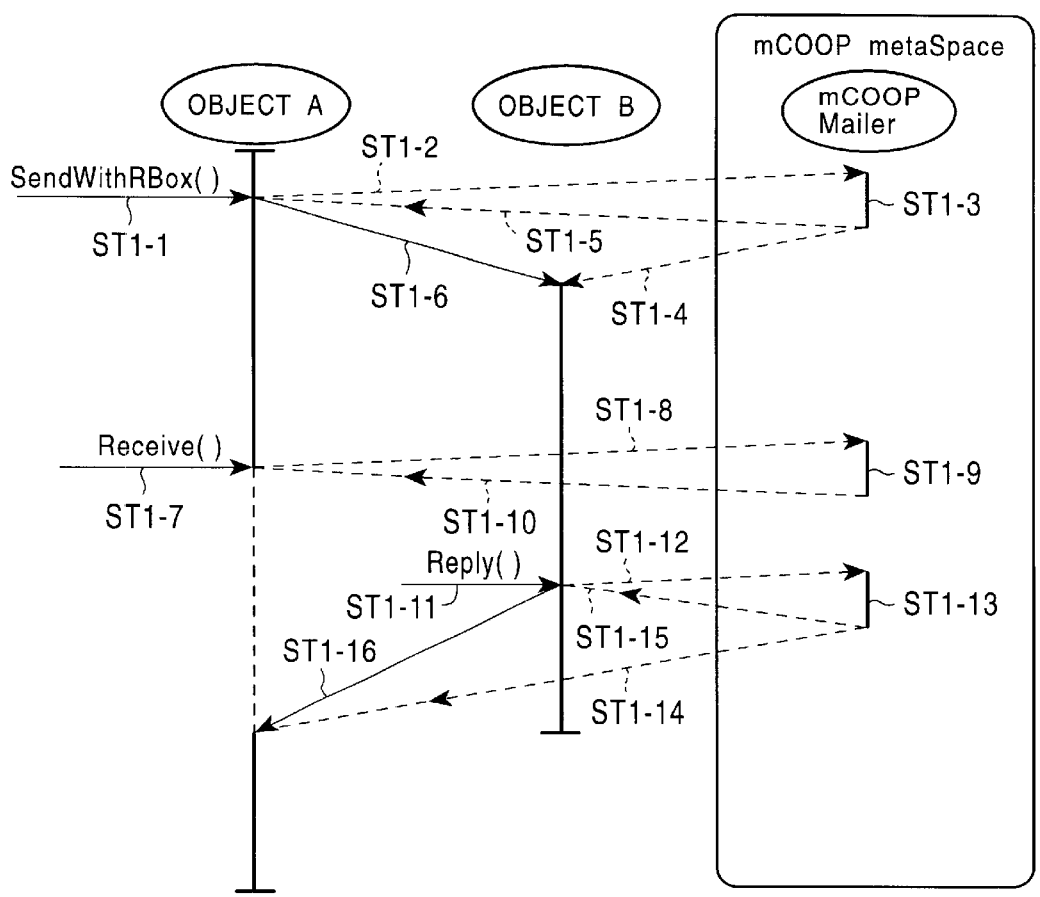
FIG. 4 illustrates an example of a scenario of message passing performed by using the method "SendWithRBox" when the processing proceeds in a normal condition.

A description is first given, with reference to FIG. 4, of message passing performed by using the method "SendWithRBox" in the mCOOP metaSpace when the processing is executed in a normal condition without the occurrence of an exception.

FIG. 4 illustrates a basic scenario of message passing performed by using the method "SendWithRBox" between an object A operating as an application program in the mCOOP metaSpace and an object B operating as an application program in the mCOOP metaSpace. That is, in this example, the object A is a client object, while the object B is a server object.

When the object A issues the method "SendWithRBox", as indicated by ST1-1, the processing is shifted to the object "mCOOPMailer", as represented by the single-dot-chain arrow ST1-2, and the processing in accordance with the method "SendWithRBox" is executed by the object "mCOOPMailer", as designated by ST1-3.

The object "mCOOPMailer" first reserves the data area "RBox" for storing the result of processing executed by the server object (in this example, the object B), and sets the identifier for specifying the data area "Thread" corresponding to the object A in the attribute "creator" of the data area "RBox".

The object "mCOOPMailer" then reserves the data area "DeliveryBoxA", and stores the identifier "rBoxID" for specifying the data area "RBox" and the message sent by the method "SendWithRBox" therein.

The identifier "rBoxID" for designating the data area "RBox" is stored in the data area "DeliveryBoxA", and more specifically, the value of the identifier "rBoxID" for specifying the data area "RBox" is set in the attribute "rBoxID" of the data area "DeliveryBoxA".

The message sent by the method "SendWithRBox" is stored in the data area "DeliveryBoxA", and more specifically, the value of the argument "msg" of the method "SendWithRBox" is set in the attribute "msg" of the data area "DeliveryBoxA", and also, the value of the argument "sizeOfMsg" of the method "SendWithRBox" is set in the attribute "sizeOfMsg" of the data area "DeliveryBoxA".

Thereafter, the object "mCOOPMailer" delivers to the object B, as indicated by the single-dot-chain arrow ST1-4, the data stored in the data area "DeliveryBoxA", i.e., the message sent by the method "SendWithRBox", and the identifier "rBoxID" for specifying the reserved data area "RBox", thereby starting the method of the object B.

In this case, only the message is delivered to the method of the object B, and the identifier "rBoxID" is stored in the data area "Thread" corresponding to the object B. In other words, the identifier "rBoxID" to be delivered to the object B is under the management of the operating system, and it is only the message that is sent to the object B, from the point of view of the application program.

In starting the method of the object B by delivering the data stored in the data area "DeliveryBoxA" from the object "mCOOPMailer" to the object B, the object B is specified by the argument "destObjID" of the method "SendWithRBox", and the method of the object B is designated by the argument "meth" of the method "SendWithRBox".

Upon completing the aforementioned processing, as represented by the single-dot-chain arrow ST1-5, the object "mCOOPMailer" returns to the object A the identifier "rBoxID" for specifying the reserved data area "RBox", and also returns to the object A the value indicating that the processing has been correctly completed as the return value to the method "SendWithRBox". The object "mCOOPMailer" then enables the object A to restart processing. The object A is now ready to execute processing, and if there is any remaining processing, the object A restarts the processing.

According to the above-described processing, the message is delivered from the object A to the object B, as indicated by the solid arrow ST1-6, and it is as if the object A and the object B were concurrently operating, from the point of view of the application programs.

Subsequently, when the object A issues the method "Receive", as designated by ST1-7, the processing is shifted to the object "mCOOPMailer", as represented by the single-dot-chain arrow ST1-8, and the processing in response to the method "Receive" is executed by the object "mCOOPMailer", as indicated by ST1-9. More specifically, the object "mCOOPMailer" refers to the data area "RBox" designated by the argument "rBoxID" of the method "Receive". If the result of the processing executed by the object B is stored in the data area "RBox", the object "mCOOPMailer" delivers the result to the object A. If the result of the processing performed by the object B is not stored in the data area "RBox", the object "mCOOPMailer" shifts the state of the object A from the execution state to the waiting state.

In this example, when the object A has issued the method "Receive", the object B has not issued the method "Reply", and thus, the result of the processing executed by the object B is not yet stored in the data area "RBox". Accordingly, the object "mCOOPMailer" informs the object A, as represented by the single-dot-chain arrow ST1-10, that the processing result of the object B is not yet stored in the data area "RBox", and shifts the state of the object A from the execution state to the waiting state.

Thereafter, when the object B issues the method "Reply", as indicated by ST1-11, the processing is shifted to the object "mCOOPMailer", as designated by the single-dot-chain arrow ST1-12, and the processing in accordance with the method "Reply" is executed by the object "mCOOPMailer", as indicated by ST1-13. More specifically, if the object A has already issued the method "Receive", the object "mCOOPMailer" delivers the result of the processing executed by the object B to the object A. If the object A has not yet issued the method "Receive", the object "mCOOPMailer" stores the processing result of the object B in the data area "RBox".

In this example, when the object B has issued the method "Reply", the object A has already issued the method "Receive". Accordingly, the object "mCOOPMailer" directly delivers the processing result of the object B to the object A, as represented by the single-dot-chain arrow ST1-14, without storing the processing result in the data area "RBox". Upon completing the processing in a normal condition for the delivery of the processing result of the object B to the object A, the object "mCOOPMailer" returns to the object B, as represented by the single-dot-chain arrow ST1-15, the value indicating that the processing has been correctly completed as the return value to the method "Reply". The object "mCOOPMailer" then enables the object B to restart processing. The object B is now ready to perform processing, and if there is any remaining processing, the object B restarts the processing.

According to the aforementioned processing, the result of the processing performed by the object B is delivered to the object A, as indicated by the solid arrow ST1-16, and it is as if the object A and the object B were concurrently operating, from the point of view of the application programs.

In the example shown in FIG. 4, the method "Receive" has been issued before the method "Reply" is issued. Alternatively, the method "Receive" may be issued after the method "Reply" has been issued. In this case, the object A is able to immediately receive the result of the processing executed by the object B without entering the waiting state.

If the object A issues the method "Receive" after the object B has issued the method "Reply", the object "mCOOPMailer" executes the following processing. The object "mCOOPMailer" stores the processing result of the object B in the data area "RBox" upon issuing the method "Reply" by the object B. Then, when the object A issues the method "Receive", the "mCOOPMailer" immediately reads the processing result of the object B from the data area "RBox" and delivers it to the object A.

The result of the processing executed by the object B is stored in the data area "RBox". More specifically, the value indicating that the processing result of the object B has been returned is set in the attribute "ready" of the data area "RBox", and the pointer to the area for storing the message to be delivered to the object A as the processing result of the object B, i.e., the pointer represented by the argument "resultMsg" of the method "Reply", is set in the attribute "resultMsg" of the data area "RBox", and also, the value indicating the size of the message to be delivered to the object A as the processing result of the object B, i.e., the value represented by the argument "sizeOfResultMsg" of the method "Reply", is set in the attribute "sizeOfResultMsg" of the data area "RBox".

In reading the processing result of the object B from the data area "RBox" and delivering it to the object A, the object "mCOOPMailer" first reads the attribute "resultMsg" and the attribute "sizeOfResultMsg" of the data area "RBox" from the data area "RBox" which is specified by the argument "rBoxID" of the method "Receive", and then reads the data having the size indicated by the attribute "sizeOfResultMsg" from the area represented by the attribute "resultMsg". The read data serves as a message to be delivered from the object B to the object A. The object "mCOOPMailer" then stores the read data in the area indicated by the argument "msg" of the method "Receive". The size of the area designated by the argument "msg" of the method "Receive" has been set by the argument "sizeOfMsg" of the method "Receive".

According to the above-described processing, when the method "Receive" is issued after the method "Reply" has been issued, as well as when the method "Receive" has been issued before the method "Reply" is issued, the result of the processing executed by the object B is delivered to the object A, and it is as if the object A and the object B were concurrently operating.

2-5-1-2 When an Exception Occurs

A description is now given below, with reference to FIG. 5, of message passing performed by using the method "SendWithRBox" in the mCOOP metaSpace when an exception, which interrupts the normal processing of the server object, occurs.

Figure 5:
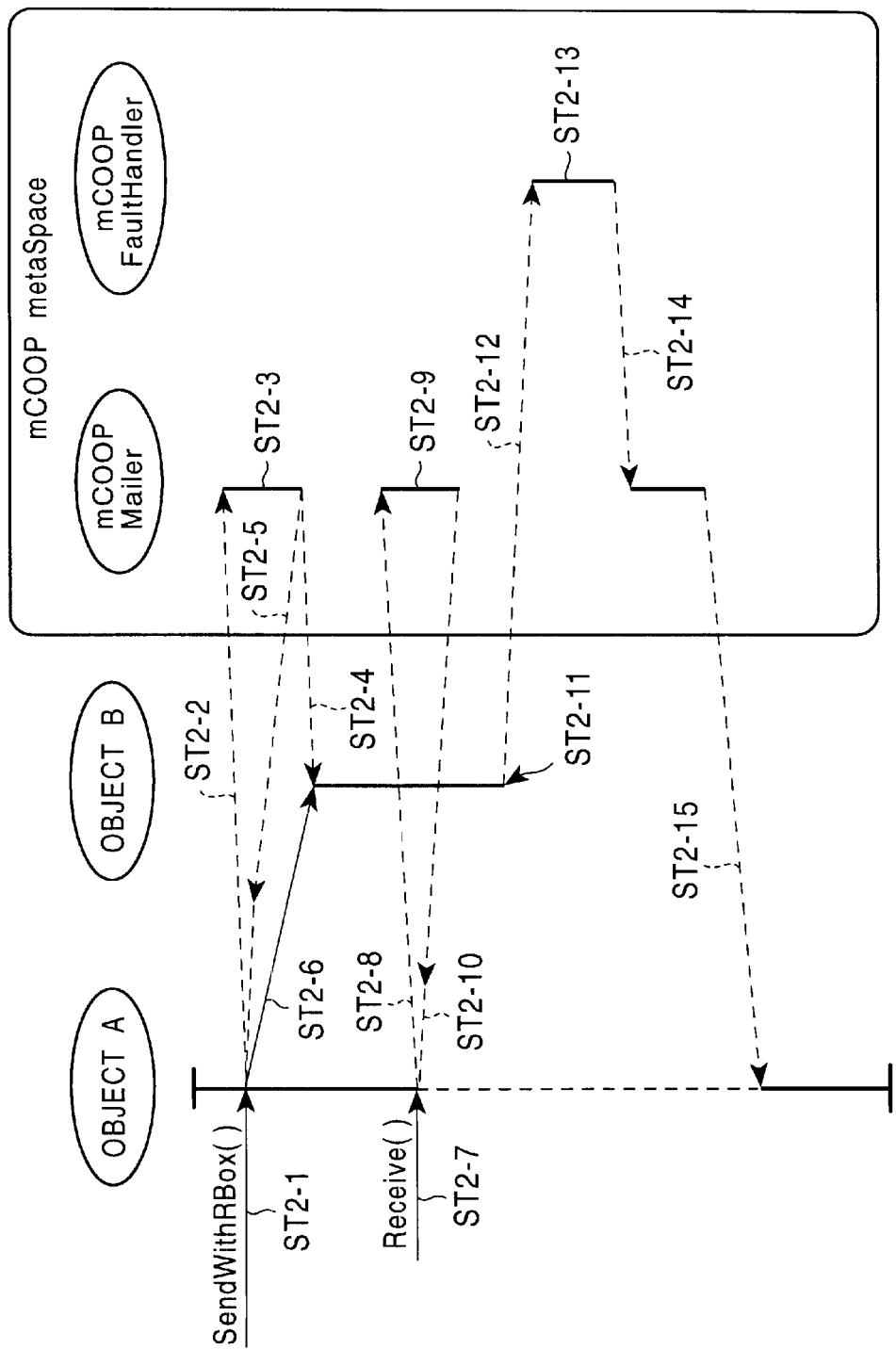
FIG. 5 illustrates an example of a scenario of message passing performed by using the method "SendWithRBox" when an exception occurs.

FIG. 5 illustrates a basic scenario of message passing performed by using the method "SendWithRBox" in the mCOOP metaSpace between an object A operating as an application program in the mCOOP metaSpace and an object B operating as an application program in the mCOOP metaSpace. That is, in this example, the object A is a client object, while the object B is a server object. It is now assumed in this scenario that an exception occurs to the object B after the method "Receive" has been issued by the object A, and the object B becomes inoperable.

In this scenario, steps ST2-1, ST2-2, ST2-3, ST2-4, ST2-5, ST2-6, ST2-7, ST2-8, ST2-9, and ST2-10 shown in FIG. 5 are respectively similar to steps ST1-1, ST1-2, ST1-3, ST1-4, ST1-5, ST1-6, ST1-7, ST1-8, ST1-9, and ST1-10 shown in FIG. 4, and an explanation thereof will thus be omitted.

In this scenario, after processing proceeds to step ST2-10, when the object A is in the waiting state, and when the object B is executing processing, an exception, which interrupts normal processing of the object B, occurs.

When an exception, which interrupts the normal processing of the object B, occurs, as indicated by ST2-11, the processing is shifted to the object "mCOOPFaultHandler", as represented by the single-dot-chain arrow ST2-12, and predetermined exception handling is performed by the object "mCOOPFaultHandler", as indicated by ST2-13. Then, the object "mCOOPFaultHandler" reports to the object "mCOOPMailer", as indicated by the single-dot-chain arrow ST2-14, that the object B has become inoperable due to the occurrence of an exception.

At this time, the object A is in the waiting state after issuing the method "Receive". Then, the object "mCOOPMailer" returns to the object A, as represented by the single-dot-chain arrow ST2-15, the error code indicating that the object B has become inoperable due to the occurrence of an exception as the return value to the method "Receive", and also enables the object A to restart processing. The object A is now ready to execute processing, and if there is any remaining processing, the object A restarts the processing.

According to the aforementioned processing, although the object A is unable to receive a result message, which would be expected to be obtained from the object B, it receives the error code, as the return value, indicating that the object B has become inoperable, and is able to resume the execution of processing. The object A then performs the processing in response to the occurrence of an error.

For example, the message indicating that an exception has occurred to the object B may be displayed on an image display unit, and the user may be instructed to reset the processing. Alternatively, an object as an alternative to the object B may be downloaded from an external source via a network, and message passing may be performed again.

In the scenario shown in FIG. 5, an exception occurs to the object B after the method "Receive" has been issued by the object A. However, an exception may occur to the object B before the method "Receive" is issued by the object A.

If an exception has occurred to the object B before the method "Receive" is issued by the object A, the object "mCOOPMailer" sets in the attribute "status" of the data area "RBox" the error code indicating that the object B has become inoperable due to the occurrence of an exception.

Then, when the object A issues the method "Receive", the object "mCOOPMailer" reads the error code set in the attribute "status" of the data area "RBox", and returns the error code to the object A as the return value to the method "Receive". The object "mCOOPMailer" then enables the object A to resume processing. In a manner similar to the previous scenario, the object A is now ready to perform processing, and if there is any remaining processing, the object A restarts the processing.

As described above, the error code indicating that the object B has become inoperable due to the occurrence of an exception is set in the attribute "status" of the data area "RBox". This prevents the object A from wastefully entering the waiting state upon issuing the method "Receive", and the object A immediately recognizes that the object B has become inoperable due to the occurrence of an exception.

In the foregoing scenarios, an exception has occurred to the object B. In other cases, if a result message cannot be returned to the object A for some reason, the error code is set in the attribute "status" of the data area "RBox". With this arrangement, even if a result message cannot be returned to the object A for some reason, the error code is returned to the object A so that the object A can be resumed to the operable state from the waiting state, which would otherwise cause the object A to enter the waiting state and would stop the system.

2-5-2 Message Passing Using Delegate( )

A description is given below, with reference to FIG. 6, of message passing performed by using the method "Delegate" employed when a processing request is received and a processing result is returned by different server objects.

Figure 6:
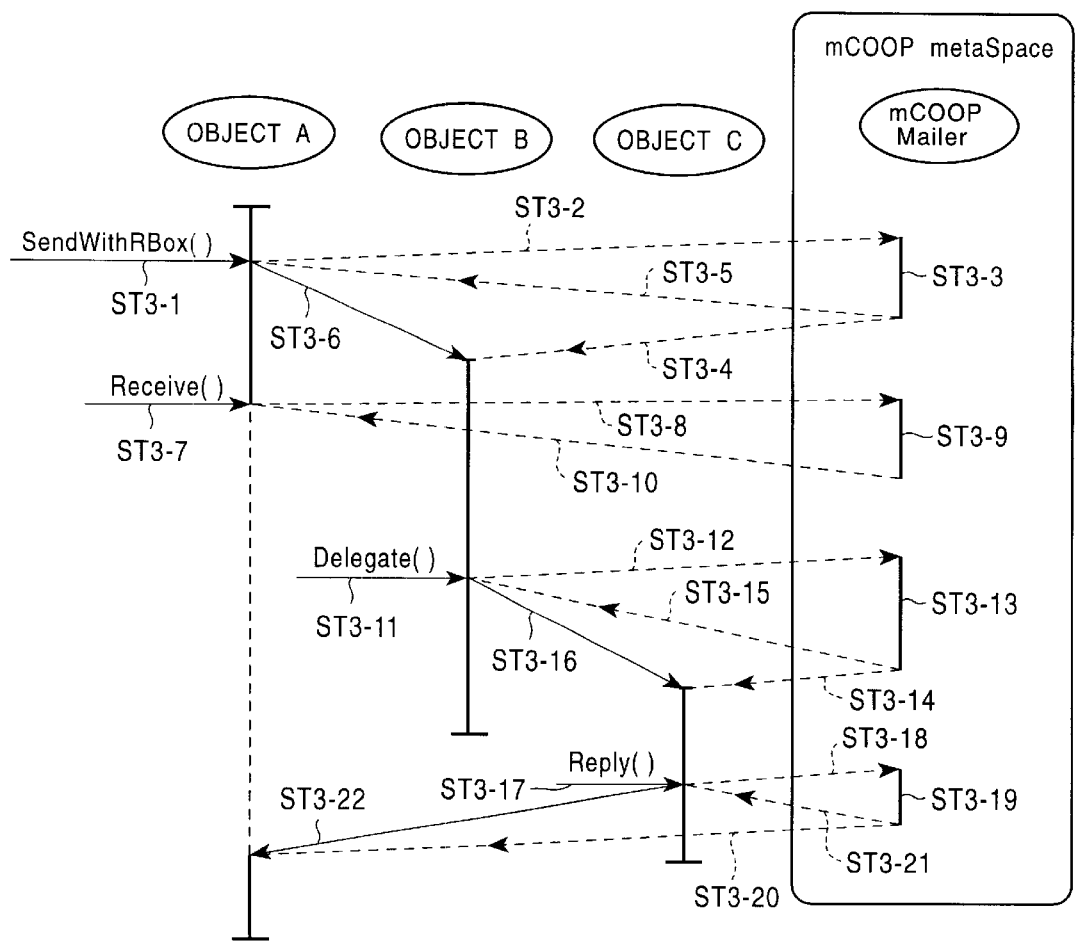
FIG. 6 illustrates an example of a scenario of message passing performed in the server object in which a processing request is received and a processing result is returned by different server objects.

FIG. 6 illustrates a scenario of message passing performed in the mCOOP metaSpace among an object A, an object B, and an object C, all of which are operating as application programs in the mCOOP metaSpace. In this scenario, the reply authorization is delegated from the object B to the object C.

That is, in this example, the object A is a client object, while the object B and the object C are server objects. The object B delegates the object C to return the processing result to the object A. That is, the object B serves as a server object and also as an authorization-delegating object. The object C serves as a server object and also as an authorization-delegated object.

When the object A issues the method "SendWithRBox", as indicated by ST3-1, the processing is shifted to the object "mCOOPMailer", as represented by the single-dot-chain arrow ST3-2, and the processing in accordance with the method "SendWithRBox" is executed by the object "mCOOPMailer", as designated by ST3-3.

The object "mCOOPMailer" first reserves the data area "RBox" for storing the result of the processing executed by the server object; and then sets the identifier for specifying the data area "Thread" corresponding to the object A in the attribute "creator" of the data area "RBox".

Subsequently, the object "mCOOPMailer" reserves the data area "DeliveryBoxA", and stores the identifier "rBoxID" for designating the data area "RBox" and the message sent by the method "SendWithRBox" therein.

The identifier "rBoxID" for specifying the data area "RBox" is stored in the data area "DeliveryBoxA". More specifically, the value of the identifier "rBoxID" for designating the data area "RBox" is set in the attribute "rBoxID" of the data area "DeliveryBoxA".

The message sent by the method "SendWithRBox" is stored in the data area "DeliveryBoxA". More specifically, the value of the argument "msg" of the method "SendWithRBox" is set in the attribute "msg" of the data area "DeliveryBoxA", and also, the value of the argument "sizeOfMsg" of the method "SendWithRBox" is set in the attribute "sizeOfMsg" of the data area "DeliveryBoxA".

Thereafter, the object "mCOOPMailer" delivers to the object B, as indicated by the single-dot-chain arrow ST3-4, the data stored in the data area "DeliveryBoxA", i.e., the message sent by the method "SendWithRBox", and the identifier "rBoxID" for designating the reserved data area "RBox", thereby starting the method of the object B.

In this case, only the message is sent to the method of the object B, and the identifier "rBoxID" is stored in the data area "Thread" corresponding to the object B. In other words, the identifier "rBoxID" to be delivered to the object B is under the management of the operating system, and it is only the message that has been sent to the object B, from the point of view of the application program.

In starting the method of the object B by delivering the data stored in the data area "DeliveryBoxA" from the object "mCOOPMailer" to the object B, the object B is specified by the argument "destObjID" of the method "SendWithRBox", and the method of the object B is designated by the argument "meth" of the method "SendWithRBox".

Upon completing the aforementioned processing, as designated by the single-dot-chain arrow ST3-5, the object "mCOOPMailer" returns the identifier "rBoxID" for specifying the reserved data area "RBox" to the object A, and also returns to the object A the value indicating that the processing has been correctly completed, as the return value to the method "SendWithRBox". The object "mCOOPMailer" then enables the object A to restart processing. The object A is now ready to execute processing, and if there is any remaining processing, the object A restarts the processing.

According to the above-described processing, the message has been sent from the object A to the object B, as represented by the solid arrow ST3-6, and it is as if the object A and the object B were concurrently operating, from the point of view of the application programs.

Subsequently, upon issuing the method "Receive" by the object A, as indicated by ST3-7, the processing is shifted to the object "mCOOPMailer", as designated by the single-dot-chain arrow ST3-8, and the processing in response to the method "Receive" is executed by the object "mCOOPMailer", as designated by ST3-9. More specifically, the object "mCOOPMailer" refers to the data area "RBox" specified by the argument "rBoxID" of the method "Receive". If the result of the processing performed by the server object is stored in the data area "RBox", the "mCOOPMailer" delivers the result to the object A. If the processing result of the server object is not stored in the data area "RBox", the object "mCOOPMailer" changes the state of the object A from the execution state to the waiting state.

In this example, when the object A has issued the method "Receive", the server object has not issued the method "Reply". Accordingly, the result of the processing executed by the server object is not yet stored in the data area "RBox". Thus, the object "mCOOPMailer" reports to the object A, as indicated by the single-dot-chain arrow ST3-10, that the processing result of the server object is not stored in the data area "RBox", and changes the state of the object A from the execution state to the waiting state.

Thereafter, when the object B issues the method "Delegate", as indicated by ST3-11, the processing is shifted to the object "mCOOPMailer", as represented by the single-dot-chain arrow ST3-12, and the processing in accordance with the method "Delegate" is performed by the object "mCOOPMailer", as designated by ST3-13.

More specifically, the object "mCOOPMailer" first reserves the data area "DeliveryBoxA". The object "mCOOPMailer" then reads the identifier "rBoxID" stored in the data area "Thread" corresponding to the object B, and sets the value of the identifier "rBoxID" in the attribute "rBoxID" of the data area "DeliveryBoxA".

Simultaneously, the identifier "rBoxID" stored in the data area "Thread" corresponding to the object B is erased, thereby depriving the object B of the reply authorization. That is, the object B loses the reply authorization by issuing the method "Delegate", and delegates the reply authorization to the object C. Since the object B has lost the reply authorization, it is unable to issue the method "Reply". In other words, the object B has issued the method "Delegate" instead of the method "Reply".

The object "mCOOPMailer" also stores the message sent by the method "Delegate" in the data area "DeliveryBoxA". More specifically, the value of the argument "msg" of the method "Delegate" is set in the attribute "msg" of the data area "DeliveryBoxA", and also, the value of the argument "sizeOfMsg" of the method "Delegate" is set in the attribute "sizeOfMsg" of the data area "DeliveryBoxA".

The object "mCOOPMailer" then delivers to the object C, as indicated by the single-dot-chain arrow ST3-14, the data stored in the data area "DeliveryBoxA", i.e., the message sent by the method "Delegate", and the identifier "rBoxID" for specifying the data area "RBox", thereby starting the method of the object C.

In this case, only the message has been sent to the method of the object C, and the identifier "rBoxID" is stored in the data area "Thread" corresponding to the object C. In other words, the identifier "rBoxID" to be delivered to the object C is under the management of the operating system, and it is only the message that has been sent to the object B, from the point of view of the application program.

In starting the method of the object C by delivering the data stored in the data area "DeliveryBoxA" from the object "mCOOPMailer" to the object C, the object C is specified by the argument "destObjID" of the method "Delegate", and the method of the object C is designated by the argument "meth" of the method "Delegate".

Upon completing the aforementioned processing, the object "mCOOPMailer" returns to the object B, as indicated by the single-dot-chain arrow ST3-15, the value indicating that the processing has been correctly completed, as the return value to the method "Delegate", and then enables the object B to restart processing. The object B is now ready to execute processing, and if there is any remaining processing, the object B restarts the processing.

According to the aforementioned processing, the reply authorization is delegated to the object C from the object B, as represented by the solid arrow ST3-16, and it is as if the object B and the object C were concurrently operating, from the point of view of the application programs.

Subsequently, when the object C issues the method "Reply", as indicated by ST3-17, the processing is shifted to the object "mCOOPMailer", as designated by the single-dot-chain arrow ST3-18, and the processing in response to the method "Reply" is executed by the object "mCOOPMailer", as represented by ST3-19. More specifically, If the object A has already issued the method "Receive", the object "mCOOPMailer" immediately delivers the processing result of the object C to the object A. If the object A has not yet issued the method "Receive", the object "mCOOPMailer" stores the processing result of the object C in the data area "RBox".

In this example, when the object C has issued the method "Reply", the object A has already issued the method "Receive". Accordingly, the object "mCOOPMailer" immediately delivers to the object A, as indicated by the single-dot-chain arrow ST3-20, the processing result of the object C without storing it in the data area "RBox". Upon completing the processing for delivering the processing result of the object C to the object A in a normal condition, the object "mCOOPMailer" returns to the object C, as represented by the single-dot-chain arrow ST3-21, the value indicating that the processing has been correctly completed, as the return value to the method "Reply". The object "mCOOPMailer" then enables the object C to restart processing. The object C is now ready to execute processing, and if there is any remaining processing, the object C restarts the processing.

According to the above-described processing, the result of the processing executed by the object C has been sent to the object A, as represented by the solid arrow ST3-22, and it is as if the object A and the object C were concurrently operating, from the point of view of the application programs.

In the example shown in FIG. 6, the method "Receive" has been issued before the method "Reply" is issued. Alternatively, the method "Receive" may be issued after the method "Reply" has been issued. In this case, the object A is able to immediately receive the result of the processing executed by the object C without entering the waiting state.

If the object A issues the method "Receive" after the object C has issued the method "Reply", the object "mCOOPMailer" executes the following processing. The object "mCOOPMailer" stores the processing result of the object C in the data area "RBox" when the method "Reply" is issued by the object C. Then, when the object A issues the method "Receive", object "mCOOPMailer" immediately reads the processing result of the object C from the data area "RBox" and delivers it to the object A.

The result of the processing executed by the object C is stored in the data area "RBox". More specifically, the value indicating that the processing result of the object C has been returned is set in the attribute "ready" of the data area "RBox", and the pointer to the area for storing the message to be delivered to the object A as the processing result of the object C, i.e., the pointer represented by the argument "resultMsg" of the method "Reply", is set in the attribute "resultMsg" of the data area "RBox". Further, the value indicating the size of the message to be delivered to the object A as the processing result of the object C, i.e., the value represented by the argument "sizeOfResultMsg" of the method "Reply", is set in the attribute "sizeOfResultMsg" of the data area "RBox".

In reading the processing result of the object C from the data area "RBox" and delivering it to the object A, the object "mCOOPMailer" first reads the attribute "resultMsg" and the attribute "sizeOfResultMsg" of the data area "RBox" from the data area "RBox" which is specified by the argument "rBoxID" of the method "Receive", and then reads the data having the size indicated by the attribute "sizeOfResultMsg" from the area represented by the attribute "resultMsg". The read data serves as a message to be delivered from the object C to the object A. The object "mCOOPMailer" then stores the read data in the area indicated by the argument "msg" of the method "Receive". The size of the area designated by the argument "msg" of the method "Receive" has been set by the argument "sizeOfMsg" of the method "Receive".

According to the above-described processing, when the method "Receive" is issued after the method "Reply" has been issued, as well as when the method "Receive" has been issued before the method "Reply" is issued, the result of the processing executed by the object C is delivered to the object A, and it is as if the object A and the object C were concurrently operating.

According to the foregoing description, by introducing the method "Delegate" as an API used for describing an object, even if there are a plurality of server objects, the reply authorization can be delegated among the server objects. In other words, by introducing the method "Delegate", even if there are a plurality of server objects, and even if a server object that receives a processing request is different from a server object that returns a processing result, message passing can be suitably performed.

Additionally, with the introduction of the method "Delegate", in delegating the reply authorization among a plurality of server objects, the data area "RBox" and the identifier "rBoxID" for specifying the data area "RBox" are transparent to the application programs. This enhances the simplicity of the development of application programs.

If the object delegated to possess the reply authorization by the method "Delegate" (in this example, the object C) becomes inoperable due to, for example, the occurrence of an error, and is unable to acquire a result, exception handling is performed in a manner similar to the scenario shown in FIG. 5.

More specifically, in the example shown in FIG. 6, if the object C delegated to possess the reply authorization by the method "Delegate" becomes inoperable during execution due to the occurrence of an error and is unable to obtain a result, the processing is shifted to the object "mCOOPFaultHandler", and predetermined exception handling is performed by the object "mCOOPFaultHandler". The object "mCOOPFaultHandler" then reports to the object "mCOOPMailer" that the object C has become inoperable due to the occurrence of an error.

In this case, if the object A has already issued the method "Receive" and is in the waiting state, the object "mCOOPMailer" returns to the object A the error code indicating that the object C has become inoperable due to the occurrence of an error, as the return value to the method "Receive", and then enables the object A to restart processing. Thus, the object A is ready to execute processing, and if there is any remaining processing, the object A restarts the processing.

On the other hand, if an exception has occurred to the object C before the object A issues the method "Receive", the object "mCOOPMailer" sets in the attribute "status" of the data area "RBox" the error code indicating that the object C has become inoperable due to the occurrence of an error. Then, when the object A issues the method "Receive", the object "mCOOPMailer" reads the error code set in the attribute "status" of the data area "RBox", and returns the error code to the object A as the return value to the method "Receive". The object "mCOOPMailer" then enables the object A to restart processing. Accordingly, the object A is ready to execute processing, and if there is any remaining processing, the object A restarts the processing.

According to the aforementioned processing, even if the object C delegated to possess the reply authorization is unable to return a result message to the object A for some reason, the object A can resume the execution state from the waiting state, which would otherwise cause the object A to enter the waiting state and would stop the system.

2-5-3 Message Passing Using SendWithContinuation( )

A description is now given below, with reference to FIG. 7, of message passing performed by using the method "SendWithContinuation" in the mDrive metaSpace.

Figure 7:
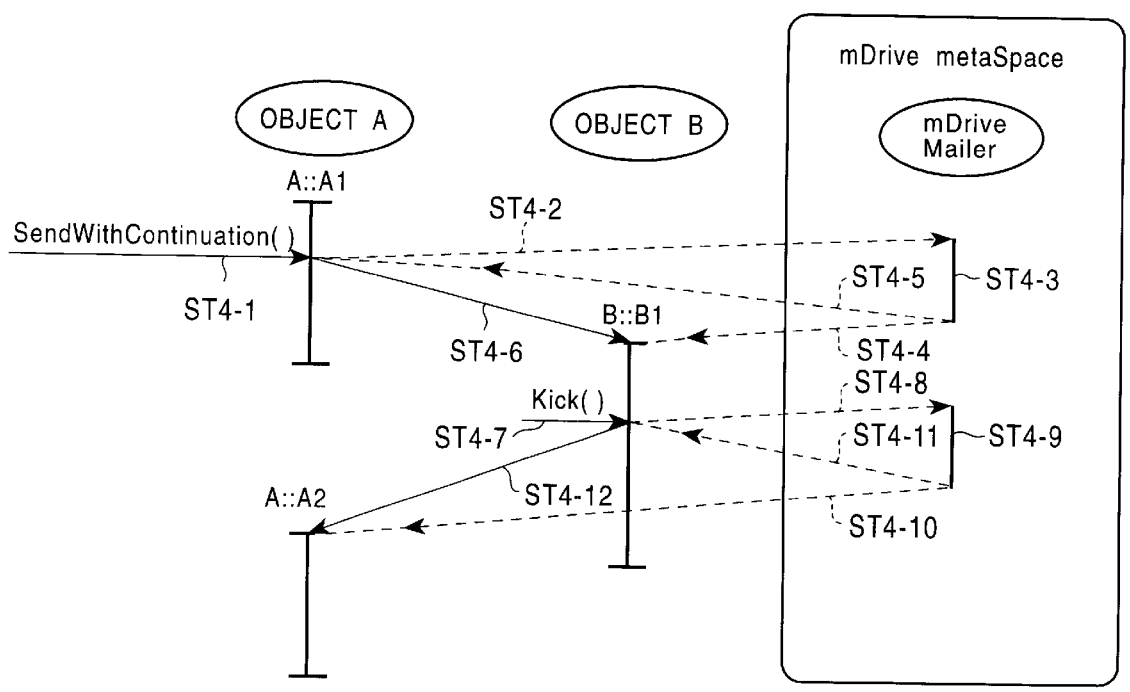
FIG. 7 illustrates an example of a scenario of message passing performed by using the method "SendWithContinuation"

FIG. 7 illustrates a basic scenario of message passing performed in the mDrive metaSpace between an object A operating as a device driver in the mDrive metaSpace and an object B operating as a device driver in the mDrive metaSpace. That is, in this example, the object A is a client object, while the object B is a server object.

In FIG. 7, the method of the object A that issues the method "SendWithContinuation" is indicated by "A::A1", while the method of the object B that is started by the method "SendWithContinuation" and also issues the method "Kick" is represented by "B::B1". Moreover, the method of the object A started by the method "Kick", i.e., the continuation method, is indicated by "A::A2".

When the object A issues the method "SendWithContinuation" within the method "A::A1", as indicated by ST4-1, the processing is shifted to the object "mDriveMailer", as represented by the single-dot-chain arrow ST4-2, and the processing in accordance with the method "SendWithContinuation" is performed by the object "mDriveMailer", as designated by ST4-3.

The object "mDriveMailer" first reserves the data area "Continuation", and stores the information concerning the continuation method therein. More specifically, the value of the identifier for specifying the data area "Thread" corresponding to the object A is set in the attribute "creator" of the data area "Continuation", and also, the value of the argument "contMeth" of the method "SendWithContinuation" is set in the attribute "meth" of the data area "Continuation".

The object "mDriveMailer" also reserves the data area "DeliveryBoxB", and stores the identifier "contID" for designating the data area "Continuation", and the message sent by the method "SendWithContinuation" therein. The identifier "contID" for specifying the data area "Continuation" is stored in the data area "DeliveryBoxB", and more specifically, the value of the identifier "contID" for specifying the data area "Continuation" is set in the attribute "contID" of the data area "DeliveryBoxB". Moreover, the message sent by the method "SendWithContinuation" is stored in the data area "DeliveryBoxB", and more specifically, the value of the argument "msg" of the method "SendWithContinuation" is stored in the attribute "msg" of the data area "DeliveryBoxB", and also, the value of the argument "sizeOfMsg" of the method "SendWithContinuation" is set in the attribute "sizeOfMsg" of the data area "DeliveryBoxB".

Thereafter, the object "mDriveMailer" delivers to the object B, as indicated by the single-dot-chain arrow ST4-4, the data stored in the data area "DeliveryBoxB", i.e., the message sent by the method "SendWithContinuation", and the identifier "contID" for specifying the data area "Continuation", thereby starting the method "B::B1" of the object B.

In starting the method "B::B1" of the object B by delivering the data stored in the data area "DeliveryBoxB" from the object "mDriveMailer" to the object B, the object B is specified by the argument "destObjID" of the method "SendWithContinuation", and the method "B::B1" of the object B is designated by the argument "meth" of the method "SendWithContinuation".

Upon completing the above-described processing, the object "mDriveMailer" returns to the object A, as indicated by the single-dot-chain arrow ST4-5, the value indicating that the processing has been correctly completed, as the return value to the method "SendWithContinuation", and then enables the object A to restart processing. Accordingly, the object A is ready to execute processing, and if there is any remaining processing, the object A restarts the processing.

According to the aforementioned processing, the message has been sent from the object A to the object B, as indicated by the solid arrow ST4-6, and it is as if the object A and the object B were concurrently operating, from the point of view of the device drivers.

Thereafter, the object B executes the method "B::B1", and upon completing the processing requested by the object A, the object B issues the method "Kick", as indicated by ST4-7. Upon issuing the method "Kick", the processing is shifted to the object "mDriveMailer", as represented by the single-dot-chain arrow ST4-8, and the processing in response to the method "Kick" is performed by the object "mDriveMailer", as indicated by ST4-9.

More specifically, the object "mDriveMailer" first specifies the data area "Continuation" based on the argument "contID" of the method "Kick", and then reads the information stored in the data area "Continuation".

As the attribute "creator", the value of the identifier designating the data area "Thread" corresponding to the object A is stored in the data area "Continuation". According to the identifier, the object "mDriveMailer" designates the object A as the object to be started in response to the method "Kick". The value of the argument "contMeth" of the method "SendWithContinuation", i.e., the value specifying the continuation method "A::A2", is set in the attribute "meth" of the data area "Continuation". According to the argument "contMeth", the object "mDriveMailer" specifies the method "A::A2" as the continuation method to be started in response to the method "Kick".

The object "mDriveMailer" then starts, as designated by the single-dot-chain arrow ST4-10, the method of the object specified by the information stored in the data area "Continuation", i.e., the method "A::A2" of the object A, as the continuation method. In starting the continuation method. "A::A2", the message to be delivered to the continuation method "A::A2" is designated by the arguments "msg" and "sizeOfMsg" of the method "Kick".

Upon correctly completing the start of the continuation method "A::A2" of the object A, the object "mDriveMailer" returns to the object B, as indicated by the single-dot-chain arrow ST4-11, the value indicating that the processing of the method "Kick" has been correctly completed, as the return value to the method "Kick". The object "mDriveMailer" then enables the object B to restart processing. Accordingly, the object B is ready to execute processing, and if there is any remaining processing, the object B restarts the processing.

According to the aforementioned processing, the continuation method "A::A2" of the object A is started by the object B, as designated by the solid arrow ST4-12, and it is as if the object A and the object B were concurrently operating, from the point of view of the device drivers.

2-5-4 Message Passing between Different metaSpaces

A description is given below, with reference to FIG. 8, of message passing performed by using the method "Delegate" between the mCOOP metaSpace and the mDrive metaSpace.

As a scenario of message passing performed between different metaSpaces, FIG. 8 illustrates message passing among an object A operating as an application program in the mCOOP metaSpace, an object B operating as an application program in the mCOOP metaSpace, and an object C operating as a device driver in the mDrive metaSpace. In this scenario, the object B delegates the reply authorization to the object C.

That is, in this example, the object A is a client object, while the object B and the object C are server objects. The object B delegates the object C to return the processing result to the object A. That is, the object B serves as a server object and also as an authorization-delegating object. The object C serves as a server object and also as an authorization-delegated object.

In this scenario, steps ST5-1, ST5-2, ST5-3, ST5-4, ST5-5, ST5-6, ST5-7, ST5-8, ST5-9, and ST5-10 shown in FIG. 8 are respectively similar to ST3-1, ST3-2, ST3-3, ST3-4, ST3-5, ST3-6, ST3-7, ST3-8, ST3-9, and ST3-10 shown in FIG. 2, and an explanation thereof will thus be omitted.

In this scenario, after processing proceeds to step ST5-10, when the object A is in the waiting state, and when the object B is executing processing, the object B issues the method "Delegate" for delegating the reply authorization.

When the object B issues the method "Delegate", as indicated by ST5-11, the processing is shifted to the object "mCOOPMailer", as represented by the single-dot-chain arrow ST5-12, and the processing in response to the method "Delegate" is executed by the object "mCOOPMailer", as designated by ST5-13.

In this case, the object "COOPMailer" determines whether the authorization-delegated object is an object operating in the mCOOP metaSpace. If it is found that the authorization-delegated object is an object operating in the mCOOP metaSpace, the processing proceeds in accordance with the scenario shown in FIG. 6. In this example, however, the authorization-delegated object is not an object operating in the mCOOP metaSpace, but is the object C operating in the mDrive metaSpace. Accordingly, the processing is shifted from the object "mCOOPMailer" to the object "mDriveMailer", as represented by the single-dot-chain arrow ST5-14.

A shift of the processing from the object "mCOOPMailer" to the object "mDriveMailer" is performed via a micro-kernel. More specifically, the object "mCOOPMailer" first determines based on the argument "destObjID" of the method "Delegate" that the metaSpace in which the authorization-delegated object is operating is an mDrive metaSpace. Subsequently, by using the function of the micro-kernel, the object "mCOOPMailer" requests the object "mDriveMailer", which is a metaObject for performing message passing between the objects operating in the mDrive metaSpace, to execute the required processing. Thus, the processing is shifted from the object "mCOOP-Mailer" to the object "mDriveMailer".

In this manner, after the processing is shifted from the object "mCOOPMailer" to the object "mDriveMailer", the processing in accordance with the method "Delegate" is executed by the object "mDriveMailer", as represented by ST5-15.

More specifically, the object "mDriveMailer" first reserves the data area "DeliveryBoxB". The object "mDriveMailer" then reads the identifier "rBoxID" stored in the data area "Thread" corresponding to the object B and sets the identifier "rBoxID" in the attribute "contID" of the data area "DeliveryBoxB".

Simultaneously, the identifier "rBoxID" stored in the data area "Thread" corresponding to the object B is erased, thereby depriving the object B of the reply authorization. That is, the object B loses the reply authorization by issuing the method "Delegate", and delegates the reply authorization to the object C. Since the object B has lost the reply authorization, it is unable to issue the method "Reply". In other words, the object B has issued the method "Delegate" instead of the method "Reply".

The object "mDriveMailer" also stores the message sent by the method "Delegate" in the data area "DeliveryBoxB". More specifically, the value of the argument "msg" of the method "Delegate" is set in the attribute "msg" of the data area "DeliveryBoxB", and also, the value of the argument "sizeOfMsg" of the method "Delegate" is set in the attribute "sizeOfMsg" of the data area "DeliveryBoxB".

The object "mDriveMailer" then delivers to the object C, as indicated by the single-dot-chain arrow ST5-16, the data stored in the data area "DeliveryBoxB", i.e., the message sent by the method "Delegate", and the identifier "rBoxID" for specifying the data area "RBox", thereby starting the method of the object C.

In this case, only the message has been sent to the method of the object C, and the identifier "rBoxID" is stored in the data area "Thread" corresponding to the object C. In other words, the identifier "rBoxID" to be delivered to the object C is under the management of the operating system, and it is only the message that has been sent to the object C, from the point of view of the application program.

In starting the method of the object C by delivering the data stored in the data area "DeliveryBoxB" from the object "mDriveMailer" to the object C, the object C is specified by the argument "destObjID" of the method "Delegate", and the method of the object C is designated by the argument "meth" of the method "Delegate".

Upon completing the aforementioned processing, the object "mDriveMailer" returns to the object B via the object "mCOOPMailer", as indicated by the single-dot-chain arrows ST5-17 and ST5-18, the value indicating that the processing has been correctly completed, as the return value to the method "Delegate", and then enables the object B to restart processing. The object B is now ready to execute processing, and if there is any remaining processing, the object B restarts the processing.

According to the aforementioned processing, the reply authorization has been delegated from the object B to the object C, as indicated by the solid arrow ST5-19, and it is as if the object B and the object C were concurrently operating, from the point of view of the application programs.

Thereafter, upon completing the processing requested by the object A, the object C issues the method "Kick", as designated by ST5-20. Upon issuing the method "Kick", the processing is shifted to the object "mDriveMailer", as represented by the single-dot-chain arrow ST5-21, and the processing in response to the method "Kick" is executed by the object "mDriveMailer", as indicated by ST5-22.

Simultaneously, the object "mDriveMailer" reads the information stored in the data area "Thread" corresponding to the object C. If the identifier "contID" specifying the data area "Continuation" is stored in the data area "Thread", the processing for starting the continuation method proceeds in accordance with the scenario shown in FIG. 7. In this example, however, not the identifier "contID" designating the data area "Continuation", but the identifier "rBoxID" specifying the data area "RBox" is stored in the data area "Thread".

Since the identifier "rBoxID" specifying the data area "RBox" is stored in the data area "Thread", as noted above, the processing is shifted from the object "mDriveMailer" to the object "mCOOPMailer", as indicated by the single-dot-chain arrow ST5-23, rather than starting the continuation method by the object "mDriveMailer".

A shift of the processing from the object "mDriveMailer" to the object "mCOOPMailer" is performed via the micro-kernel. More specifically, the object "mDriveMailer" first checks whether the identifier stored in the data area "Thread" corresponding to the object C is the identifier "contID" for specifying the data area "Continuation" used in the mDrive metaSpace. In this example, it is determined that the identifier stored in the data area "Thread" corresponding to the object C is not the identifier "contID" designating the data area "Continuation".

The information for determining the metaSpace in which the object to be communicated by message passing is operating is also stored in the data area "Thread" corresponding to each object. The identifier stored in the data area "Thread" corresponding to the object C is not the identifier "contID" for specifying the data area "Continuation". Thus, the data area "Thread" corresponding to the object C is further examined to determine the metaSpace in which the object to be communicated by message passing is operating. As a result, it is determined in this example that the metaSpace in which the object to be communicated by message passing is operating is an mCOOP metaSpace.

Then, by using the function of the micro-kernel, the object "mDriveMailer" requests the object "mCOOPMailer", which is a metaObject for performing message passing between the objects operating in the mCOOP metaSpace, to execute the required processing. Thus, the processing is shifted from the object "mDriveMailer" to the object "mCOOPMailer".

In this manner, after the processing has been shifted from the object "mDriveMailer" to the object "mCOOPMailer", the processing in accordance with the method "Kick" is executed by the object "mCOOPMailer", as indicated by ST5-24.

More specifically, if the object A has already issued the method "Receive", the object "mCOOPMailer" delivers the result of the processing executed by the object C to the object A. If the object A has not yet issued the method "Receive", the object "mCOOPMailer" stores the processing result of the object C in the data area "RBox".

In this example, when the object C issues the method "Kick", the object A has already issued the method "Receive". Accordingly, the object "mCOOPMailer" immediately delivers to the object A, as designated by the single-dot-chain arrow ST5-25, the processing result of the object C without storing it in the data area "RBox". Upon correctly completing the processing for the delivery of the processing result of the object C to the object A, the object "mCOOPMailer" returns to the object C via the object "mDriveMailer", as represented by the single-dot-chain arrows ST5-26 and ST5-27, the value indicating that the processing has been correctly completed, as the return value to the method "Kick". The "mCOOPMailer" then enables the object C to restart processing. The object C is now ready to execute processing, and if there is any remaining processing, the object C restarts the processing.

According to the above-described processing, the result of the processing executed by the object C has been sent to the object A, as indicated by the solid arrow ST5-28, and it is as if the object A and the object C were concurrently operating, from the point of view of the application programs.

In the example shown in FIG. 8, the method "Receive" has been issued before the method "Kick" is issued. Alternatively, the method "Receive" may be issued after the method "Kick" has been issued. In this case, the object A is able to immediately receive the result of the processing executed by the object C without entering the waiting state.

If the object A issues the method "Receive" after the object C has issued the method "Kick", the object "mCOOPMailer" executes the following processing. The object "mCOOPMailer" stores the processing result of the object C in the data area "RBox" when the method "Kick" is issued by the object C. Then, when the object A issues the method "Receive", the "mCOOPMailer" immediately reads the processing result of the object C from the data area "RBox" and delivers it to the object A.

The result of the processing executed by the object C is stored in the data area "RBox". More specifically, the value indicating that the. processing result of the object C has been returned is set in the attribute "ready" of the data area "RBox", and the pointer to the area for storing the message to be delivered to the object A as the processing result of the object C, i.e., the pointer represented by the argument "msg" of the method "Kick", is set in the attribute "resultMsg" of the data area "RBox". Moreover, the value indicating the size of the message to be delivered to the object A as the processing result of the object C, i.e., the value represented by the argument "sizeOfMsg" of the method "Kick", is set in the attribute "sizeOfResultMsg" of the data area "RBox".

In reading the processing result of the object C from the data area "RBox" and delivering it to the object A, the object "mCOOPMailer" first reads the attribute "resultMsg" and the attribute "sizeOfResultMsg" of the data area "RBox" from the data area "RBox" which is specified by the argument "rBoxID" of the method "Receive", and then reads the data having the size indicated by the attribute "sizeOfResultMsg" from the area represented by the attribute "resultMsg". The read data serves as a message to be delivered from the object C to the object A. The object "mCOOPMailer" then stores the read data in the area indicated by the argument "msg" of the method "Receive". The size of the area designated by the argument "msg" of the method "Receive" has been set by the argument "sizeOfMsg" of the method "Receive".

According to the above-described processing, when the method "Receive" is issued after the method "Kick" has been issued, as well as when the method "Receive" has been issued before the method "Kick" is issued, the result of the processing executed by the object C is delivered to the object A, and it is as if the object A and the object C were concurrently operating.

If the object delegated to possess the reply authorization by the method "Delegate" (in this example, the object C) becomes inoperable due to, for example, the occurrence of an error, and is unable to acquire a result, exception handling is performed in a manner substantially similar to the scenario shown in FIG. 5.

More specifically, in the example shown in FIG. 8, if the object C delegated to possess the reply authorization by the method "Delegate" becomes inoperable during execution due to, for example, the occurrence of an error and is unable to obtain a result, the processing is shifted to the object "mDriveFaultHandler", and predetermined exception handling is performed by the object "mDriveFaultHandler". The object "mDriveFaultHandler" then reports to the object "mCOOPMailer" via the object "mDriveMailer" that the object C has become inoperable due to the occurrence of an error.

In this case, if the object A has already issued the method "Receive" and is in the waiting state, the object "mCOOPMailer" returns to the object A the error code indicating that the object C has become inoperable due to the occurrence of an error, as the return value to the method "Receive", and then enables the object A to restart processing. Thus, the object A is ready to execute processing, and if there is any remaining processing, the object A restarts the processing.

On the other hand, if an exception has occurred to the object C before the object A issues the method "Receive", the object "mCOOPMailer" sets in the attribute "status" of the data area "RBox" the error code indicating that the object C has become inoperable due to the occurrence of an error. Then, when the object A issues the method "Receive", the object "mCOOPMailer" reads the error code set in the attribute "status" of the data area "RBox", and returns the error code to the object A as the return value to the method "Receive". The object "mCOOPMailer" then enables the object A to restart processing. Accordingly, the object A is ready to execute processing, and if there is any remaining processing, the object A restarts the processing.

According to the aforementioned processing, even if the object C delegated to possess the reply authorization is unable to return a result message to the object A for some reason, the object A can be resumed to the execution state from the waiting state, which would otherwise cause the object A to enter the waiting state and would stop the system.

As is seen from the foregoing detailed description, the present invention offers the following advantages.

When a message is sent from a client object to a server object, a data area is reserved. If processing executed by the server object is not correctly completed, the data indicating the status of the server object is delivered to the client object via the above data area.

Consequently, according to the present invention, even if the client object enters the waiting state due to some problem while future-based message passing is being performed, the status of the server object can be informed to the client object without needing to execute time-out processing, thereby enabling the client object to exit from the waiting state.

Additionally, in the present invention, if the processing executed by the server object is not correctly completed, the data indicating the status of the server object is delivered to the client object via the above-described data area, which would otherwise waste time, as in the case in which time-out processing is executed. Thus, the client object can speedily exit from the waiting state.

The data indicating the status of the server object is delivered to the client object when the processing executed by the server object is not correctly completed, thereby making it possible to specify the cause for the occurrence of a waiting state. Accordingly, the processing can be performed to suitably overcome the cause, thereby preventing the occurrence of another waiting state for the same reason.

What is claimed is:

1. A data processing method wherein a message is sent from a client object to a server object, said server object executes a processing in response to a request by said message and returns a result of said processing to said client object, said data processing method comprising the steps of:

reserving a data area having an identification number for storing result data indicating said result of said processing executed by said server object, and said data area for storing status data indicating a status of said server object, upon sending said message from said client object to said server object;

storing said result data in said data area when said processing executed by said server object has been correctly completed;

storing said status data in said data area when said processing executed by said server object has not been correctly completed;

performing one of receiving said result data by reading said result data stored in said data area by said client object using said identification number when said processing executed by said server object has been correctly completed, and receiving said status data by reading said status data stored in said data area by said client object using said identification number when said processing executed by said server object has not been correctly completed.

2. The data processing method according to claim 1, further comprising the steps of:

controlling said client object for continuing processing after said client object has sent said message to said server object, and for reading data stored in said data area when said client object requires said result of the processing executed by said server object;

controlling said client object for entering a waiting state when neither said result data nor said status data is stored in said data area upon reading said data stored in said data area; and controlling said client object for remaining in said waiting state before one of said result data and said status data is stored in said data area.

3. A recording medium whereon an operating system is recorded, wherein
 said operating system includes message-sending means, as an application program interface for describing a first object, for sending to a second object a message requesting said second object to perform a processing and to return a result of said processing to said first object; and wherein
 said operation system sends a message from a client object to a server object in accordance with said message-sending means, and reserves a data area having an identification number and including a first portion for storing result data indicating a result of processing executed by said server object and a second portion for storing status data indicating a status of said server object;
 said operating system stores said result data in said data area when said processing executed by said server object has been correctly completed, or
 said operating system stores said status data in said data area when said processing executed by said server object has not been correctly completed, and wherein
 said operating system further includes data reading means for reading data stored in said data area using said identification number, as said application program interface used for describing an object.

4. The recording medium according to claim 3, wherein said operating system controls said client object for entering a waiting state when neither said result data nor said status data is stored in said data area upon reading said data stored in said data area by said client object by using said data reading means, and controls said client object for remaining in said waiting state before one of said result data and said status data is stored in said data area.

5. A data processing apparatus comprising:
 an operating system;
 a recording medium whereon said operating system is recorded, said operating system including message-sending means, as an application program interface for describing a first object, for sending to a second object a message requesting said second object to perform a processing and to return a result of said processing to said first object, and wherein
 said operating system sends a message from a client object to a server object in accordance with said message-sending means, and reserves a data area having an identification number and including a first portion for storing result data indicating a result of processing executed by said server object and a second portion for storing status data indicating a status of said server object;
 said operating system stores said result data in said data area when said processing executed by said server object has been correctly completed, or
 said operating system stores said status data in said data area when said processing executed by said server object has not been correctly completed, and wherein
 said operating system further includes data reading means for reading data stored in said data area using said identification number, as said application program interface used for describing an object.

6. The data processing apparatus according to claim 5, wherein said operating system controls said client object for entering a waiting state when neither said result data nor said status data is stored in said data area upon reading said data stored in said data area by said client object by using said data reading means, and controls said client object for remaining in said waiting state before one of said result data and said status data is stored in said data area.

* * * * *